US009625629B2

(12) United States Patent
Kobayashi

(10) Patent No.: US 9,625,629 B2
(45) Date of Patent: Apr. 18, 2017

(54) PROCESS FOR PRODUCING OPTICALLY ANISOTROPIC FILM

(71) Applicant: Sumitomo Chemical Company, Limited, Tokyo (JP)

(72) Inventor: Tadahiro Kobayashi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/560,132

(22) Filed: Dec. 4, 2014

(65) Prior Publication Data

US 2015/0160389 A1   Jun. 11, 2015

(30) Foreign Application Priority Data

Dec. 5, 2013  (JP) ................................ 2013-251761

(51) Int. Cl.

| | |
|---|---|
| *F21V 9/14* | (2006.01) |
| *G02B 5/30* | (2006.01) |
| *G02C 7/12* | (2006.01) |
| *G02F 1/13* | (2006.01) |
| *C08F 2/46* | (2006.01) |
| *C08F 2/54* | (2006.01) |

(52) U.S. Cl.
CPC ......... *G02B 5/3016* (2013.01); *G02B 5/3033* (2013.01); *G02B 5/3083* (2013.01)

(58) Field of Classification Search
USPC ............ 252/585; 427/496; 428/1.1, 1.2, 1.3, 428/800; 349/96, 117, 118, 119, 120, 349/121, 137, 194, 499, 501; 359/489.07; 445/24
See application file for complete search history.

(56) References Cited

U.S. PATENT DOCUMENTS

| 5,780,629 A | 7/1998 | Etzbach et al. |
| 6,217,792 B1 | 4/2001 | Parri et al. |
| | (Continued) | |

FOREIGN PATENT DOCUMENTS

| JP | 06-034976 A | 2/1994 |
| JP | 09-506088 A | 6/1997 |
| | (Continued) | |

OTHER PUBLICATIONS

Liquid Crystal Handbook, Chapter 3, Section 4-3, "Chiral agent for TN and STN," ed: Japan Society for the Promotion of Science, 142 committee, pp. 199-202, 210, 213 (1989).

(Continued)

*Primary Examiner* — Bijan Ahvazi
(74) *Attorney, Agent, or Firm* — Panitch Schwarze Belisario & Nadel LLP

(57) ABSTRACT

A process for producing an optically anisotropic film having a high Δn and superior optical performance is provided. The process includes the following steps (A) and (B) carried out in order: (A) a step of applying a composition for forming an optically anisotropic film to a substrate, the composition containing a photopolymerization initiator, a solvent and a polymerizable liquid crystal compound having a maximum absorption wavelength in a range of 250 nm to 370 nm, and (B) a step of applying light with wavelengths in the range of 200 nm to 500 nm that has an allowable variation range of less than 250 nm in wavelength.

11 Claims, 3 Drawing Sheets

(56) References Cited

U.S. PATENT DOCUMENTS

| | | |
|---|---|---|
| 6,723,395 B2 | 4/2004 | May et al. |
| 7,136,225 B2 | 11/2006 | Matsumoto et al. |
| 7,169,447 B2 | 1/2007 | Su Yu et al. |
| 7,235,283 B2 | 6/2007 | Adachi et al. |
| 7,270,855 B2 | 9/2007 | Yamaoka et al. |
| 8,383,212 B2 | 2/2013 | Obata et al. |
| 2012/0008224 A1 | 1/2012 | Uchida |

FOREIGN PATENT DOCUMENTS

| | | | |
|---|---|---|---|
| JP | 2000-515496 A | 11/2000 | |
| JP | 2003-137887 A | 5/2003 | |
| JP | 2003-287623 A | 10/2003 | |
| JP | 2004-004849 A | 1/2004 | |
| JP | 2004-125842 A | 4/2004 | |
| JP | 3708062 B2 | 10/2005 | |
| JP | 2007-169178 A | 7/2007 | |
| JP | 2007-176870 A | 7/2007 | |
| JP | 2007-269639 A | 10/2007 | |
| JP | 2007-269640 A | 10/2007 | |
| JP | 2010-031223 A | 2/2010 | |
| JP | 4432487 B2 | 3/2010 | |
| JP | 2010-266883 A | 11/2010 | |
| JP | 2010-270108 A | 12/2010 | |
| JP | 2011-006360 A | 1/2011 | |
| JP | 2011-207765 A | 10/2011 | |
| JP | 2011-242743 A | 12/2011 | |
| JP | 2012-033249 A | 2/2012 | |
| JP | 2012-097078 | * 5/2012 | ........... C07D 417/04 |

OTHER PUBLICATIONS

Liquid Crystal Handbook, Chapter 3, Section 8-6, "Network (Complete cross-linked type)" and Chapter 6, Section 5-1 "Liquid crystal material b. Polymerizable nematic liquid crystal material," ed: editorial committee of Liquid Crystal Handbook, Maruzen Co., Ltd. (Oct. 30, 2000).

* cited by examiner

PROCESS FOR PRODUCING OPTICALLY ANISOTROPIC FILM

FIELD OF THE INVENTION

The present application claims the Paris Convention priority based on Japanese Patent Application No. 2013-251761 filed on Dec. 5, 2013, the entire content of which is incorporated herein by reference. The present invention relates to a process for producing an optically anisotropic film.

BACKGROUND OF THE INVENTION

A component comprising an optically anisotropic film, such as a polarization plate, a retardation film or the like, is used in a flat panel display device (FPD). As the optically anisotropic film, an optically anisotropic film is known which is produced by applying a composition comprising a polymerizable liquid crystal compound on a substrate. For example, Patent Document 1 (JP 2003-287623 A) describes an optically anisotropic film produced by applying a composition comprising a polymerizable liquid crystal compound to a substrate exposed to orientation treatment and polymerizing the polymerizable liquid crystal compound.

Patent Document 1: JP 2003-287623 A

SUMMARY OF THE INVENTION

An optically anisotropic film obtained by the conventional process for producing an optically anisotropic film does not have sufficient optical performance.

The present invention includes the following embodiments.

[1] A process for producing an optically anisotropic film, wherein the following steps (A) and (B) are carried out in order:

(A) a step of applying a composition for forming an optically anisotropic film to a substrate, the composition comprising a photopolymerization initiator, a solvent and a polymerizable liquid crystal compound having a maximum absorption wavelength in a range of 250 nm to 370 nm, and (B) a step of applying light with wavelengths in the range of 200 nm to 500 nm that has an allowable variation range of less than 250 nm in wavelength.

[2] The process for producing an optically anisotropic film according to [1], wherein the photopolymerization initiator has a maximum absorption wavelength of 300 nm to 380 nm.

[3] The process for producing an optically anisotropic film according to [1] or [2], wherein the light applied contains light having a wavelength of 365 nm.

[4] The process for producing an optically anisotropic film according to [1], wherein the light applied is a bright line having a wavelength of 365 nm.

[5] A optically anisotropic film obtained by the process according to [1], wherein the polymerizable liquid crystal compound is a compound represented by formula (A):

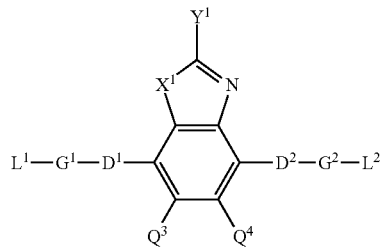

(A)

wherein $X^1$ represents an oxygen atom, a sulfur atom or $NR^1$—, where $R^1$ represents a hydrogen atom or an alkyl group having 1 to 4 carbon atoms, $Y^1$ represents a monovalent aromatic hydrocarbon group having 6 to 12 carbon atoms and optionally having a substituent, or a monovalent aromatic heterocyclic group having 3 to 12 carbon atoms and optionally having a substituent, $Q^3$ and $Q^4$ each independently represent a hydrogen atom, a monovalent aliphatic hydrocarbon group having 1 to 20 carbon atoms and optionally having a substituent, a monovalent alicyclic hydrocarbon group having 3 to 20 carbon atoms, a monovalent aromatic hydrocarbon group having 6 to 20 carbon atoms and optionally having a substituent, a halogen atom, a cyano group, a nitro group, $—NR^2R^3$ or $—SR^2$, or $Q^3$ and $Q^4$ are bonded to each other to form an aromatic ring or a heteroaromatic ring with the carbon atoms to which $Q^3$ and $Q^4$ are bonded, wherein $R^2$ and $R^3$ each independently represent a hydrogen atom or an alkyl group having 1 to 6 carbon atoms, $D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —CO—O—$CR^4R^5$—, —O—CO—$CR^4R^5$—, —$CR^4R^5$—O—CO—$CR^6R^7$—, —$CR^4R^5$—CO—O—$CR^6R^7$—, —$NR^4$—$CR^5R^6$— or —CO—$NR^4$—, wherein $R^4$, $R^5$, —$R^6$ and $R^7$ each independently represent a hydrogen atom, a fluorine atom or an alkyl group having 1 to 4 carbon atoms, $G^1$ and $G^2$ each independently represent a divalent alicyclic hydrocarbon group having 5 to 8 carbon atoms, wherein any methylene group constituting the alicyclic hydrocarbon group is optionally replaced by an oxygen atom, a sulfur atom or —NH—, and wherein any methine group constituting the alicyclic hydrocarbon group is optionally replaced by a tertiary nitrogen atom, and $L^1$ and $L^2$ each independently represent a monovalent organic group, wherein at least one of $L^1$ and $L^2$ has a polymerizable group.

[6] An optically anisotropic film obtained by the process for producing an optically anisotropic film according to [1].

[7] The optically anisotropic film according to [6], the film satisfying the following formulae (1) and (2):

$$\Delta n(450)/\Delta n(550) \leq 1.00 \tag{1}$$

$$1.00 \leq \Delta n(650)/\Delta n(550) \tag{2}$$

wherein $\Delta n(450)$, $\Delta n(550)$ and $\Delta n(650)$ represent birefringence indices for lights with wavelengths of 450 nm, 550 nm and 650 nm, respectively.

[8] The optically anisotropic film according to [6] or [7], the film having retardation performance.

[9] A retardation film comprising the optically anisotropic film according to [6].

[10] A polarization plate comprising the optically anisotropic film according to [6].

[11] A display device comprising the optically anisotropic film according to [6].

According to the present invention, it is possible to obtain an optically anisotropic film having a high Δn and superior optical performance.

DETAILED DESCRIPTION OF EMBODIMENTS

<Substrate>

Figure 1:
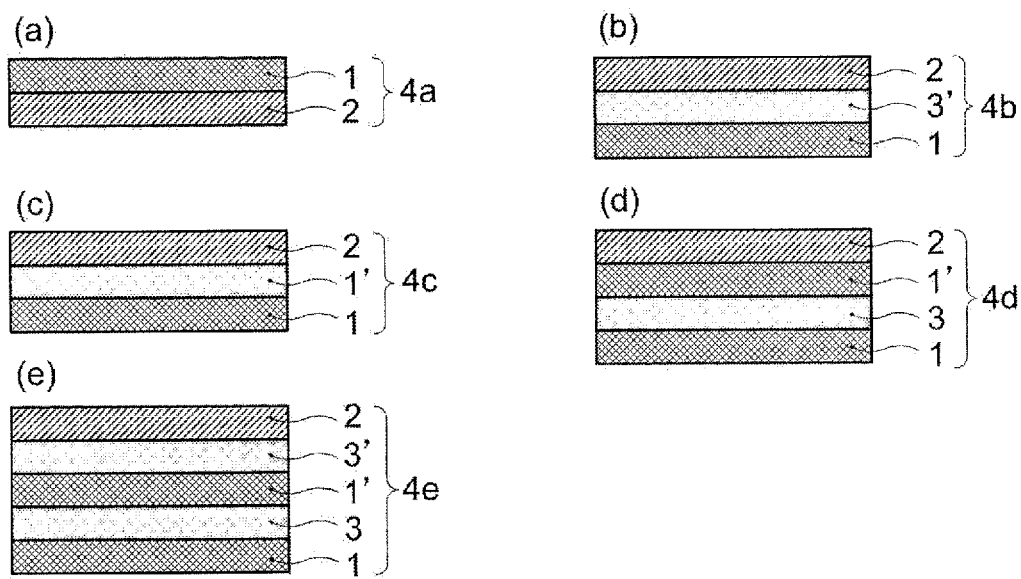
FIG. 1 is a cross-sectional diagram showing an example of a polarization plate according to the present invention.

The substrate is preferably a resin substrate.

The resin substrate is generally a transparent resin substrate. The transparent resin substrate refers to a substrate having translucency in which a light, in particular a visible light can be transmitted, and the translucency refers to a property in which a transmission of a light beam in a wavelength of 380 to 780 nm is 80% or higher. As the resin substrate, a film-shaped substrate is generally used, and an elongated film roll is preferably used. In the present specification, "long film roll" collectively refers to "roll-shaped long film" and "long film wound off from a roll-shaped long film".

Examples of a resin constituting the substrate include polyolefins such as polyethylene, polypropylene, norbornene-based polymers; polyvinyl alcohol; polyethylene terephthalate; polymethacrylic acid esters; polyacrylic acid esters; cellulosic esters; polyethylene naphthalate; polycarbonates; polysulfones; polyethersulfones; polyetherketones; polyphenylene sulfide; and polyphenylene oxide. Among them, a substrate comprising a polyolefin such as polyethylene, polypropylene or norbornene-based polymers is preferable.

A surface treatment may be performed on the substrate. Examples of a method of the surface treatment include a method of treating a substrate surface using corona or plasma under vacuum to atmosphere pressure; a laser treatment method of a substrate surface; an ozone treatment method of a substrate surface; a saponification treatment method of a substrate surface; a flame treatment method of a substrate surface; a method of applying a coupling agent to a substrate surface; a primer treatment method of a substrate surface; and a treatment method of carrying out a graft polymerization by exposure of radiation, corona or plasma after applying a reactive monomer or polymer to a substrate surface. Among them, the method of treating a substrate surface using corona or plasma under vacuum to atmosphere pressure is preferable.

Examples of the method of treating a substrate surface using corona or plasma under vacuum to atmosphere pressure include a method of treating a substrate surface by arranging the substrate between electrodes facing with each other and generating corona or plasma under a pressure close to atmosphere pressure; a method of flowing a gas between electrodes facing with each other, making the gas into plasma between the electrodes and applying the plasma-state gas to a substrate; and a method of treating a substrate surface by generating glow discharge plasma under a low pressure condition.

Among them, preferable is a method of treating a substrate surface by arranging the substrate between electrodes facing with each other and generating corona or plasma under a pressure close to atmosphere pressure, or a method of flowing a gas between electrodes facing with each other, making the gas into plasma between the electrodes and applying the plasma-state gas to a substrate. Such methods using corona or plasma are generally carried out by means of a commercially available surface treatment device.

The substrate may also have a protective film on a surface opposite to a surface to which the composition for forming an optically anisotropic film is applied. Examples of the protective film include a film such as polyethylene, polyethylene terephthalate, polycarbonate and polyolefins, and also a film additionally having an adhesion layer on the film. Among them, in view of a small thermal deformation in drying, polyethylene terephthalate is preferable. When the substrate has a protective film on a surface opposite to a surface to which the composition for forming an optically anisotropic film is applied, a shaking of the film and a slight vibration of the applied surface in conveying the substrate can be suppressed, and uniformity of a coating film can be improved.

The thickness of the substrate is generally from 5 μm to 300 μm, and preferably from 20 μm to 200 μm.

The length of the elongated film roll in the longitudinal direction is generally from 10 m to 3000 m, and preferably from 100 m to 2000 m. The length of the elongated film roll in the short direction is generally from 0.1 m to 5 m, and preferably from 0.2 m to 2 m.

<Orientation Film>

An orientation film is preferably formed on a surface to which the composition for forming an optically anisotropic film is applied.

The orientation film is a film having an orientation controlling force which orients a polymerizable liquid crystal compound described below in a desired direction.

The orientation film preferably has high solvent resistance in which the film is not dissolved by application of the composition for an optically anisotropic film or the like, and has heat resistance in a heat treatment for removing solvents or for orienting a polymerizable liquid crystal compound. Examples of the orientation film include an orientation film comprising an anisotropic polymer, a photo-orientation film, a groove orientation film having an unevenness pattern or multiple grooves on its surface, and the like.

Such an orientation film makes an orientation of a polymerizable liquid crystal compound easy. In addition, it is possible to control different orientations such as horizontal orientation, vertical orientation, hybrid orientation, inclined orientation and the like by selecting a type of an orientation film and a rubbing condition.

The thickness of the orientation film is generally in a range of 10 nm to 10000 nm, preferably in a range of 10 nm to 1000 nm, more preferably 500 nm or less, and further preferably in a range of 10 nm to 200 nm.

<Orientation Film Comprising Anisotropic Polymer>

Examples of the anisotropic polymer include polyamides and gelatins having amide bonds, polyimides having imide bonds and polyamic acids which are the hydrolysate thereof, polyvinyl alcohol, alkyl-modified polyvinyl alcohols, polyacrylamide, polyoxazoles, polyethyleneimine, polystyrene, polyvinylpyrrolidone, polyacrylic acid, and polyacrylic acid esters. Among them, polyvinyl alcohol is preferable. It is also possible to combine two or more kinds of the anisotropic polymers.

The orientation film comprising an anisotropic polymer is generally obtained by applying an anisotropic polymer composition, in which an anisotropic polymer is dissolved in a solvent, to a substrate, and removing the solvent to form a coating film, or by applying the anisotropic polymer composition to a substrate, removing the solvent to form a coating film and rubbing the coating film.

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more kinds of the solvents.

The concentration of the anisotropic polymer in the anisotropic polymer composition should be in such a range that the anisotropic polymer completely dissolves in a solvent. The content of the anisotropic polymer is preferably from 0.1 to 20% by mass and more preferably from 0.1 to 10% by mass, relative to the anisotropic polymer composition.

The anisotropic polymer composition is available in the market. Examples of a commercially available product of the anisotropic polymer composition include SUNEVER® (manufactured by NISSAN CHEMICAL INDUSTRIES, LTD.) and OPTMER® (manufactured by JSR Corporation).

Examples of a method for applying the anisotropic polymer composition to a substrate include known methods such as application methods including spin coating method, extrusion method, gravure coating method, die coating method, slit coating method, bar coating method and applicator method, and also printing methods including flexo printing method. When the optically anisotropic film is produced by a Roll-to-Roll type continuous production method, gravure coating method, die coating method or a printing method such as flexo printing method is generally employed as the application method.

Examples of a method for removing the solvent contained in the anisotropic polymer composition include air drying, draught drying, heat drying, vacuum drying and the combination method thereof. The drying temperature is preferably from 10 to 250° C., and more preferably from 25 to 200° C. The drying time is, depending on a solvent type, preferably from 5 seconds to 60 minutes, and more preferably from 10 seconds to 30 minutes.

The coating film formed of the anisotropic polymer composition may be exposed to a rubbing treatment. By the rubbing treatment, an orientation controlling force can be provided to the coating film.

Examples of a rubbing treatment method include a method in which the coating film is brought into contact with a rolling rubbing roll wrapped with a rubbing cloth.

In the rubbing treatment, it is also possible to form an orientation film having multiple areas (patterns) with different orientation directions by a masking treatment.

<Photo-orientation Film>

The photo-orientation film can be generally obtained by applying the composition for forming a photo-orientation film to a substrate, and applying a polarization light, preferably polarized UV, wherein the composition comprises a polymer or a monomer having a photoreactive group and a solvent. It is possible to arbitrarily control the direction of the orientation controlling force of the photo-orientation film by selecting a polarization direction of the applied polarization light.

The photoreactive group refers to a group which generates an orientating force by light radiation. Specific examples thereof include a group involved in a photoreaction as a source of the orientating force such as orientation-induced reaction, isomerization reaction, photodimerization reaction, photocrosslinking reaction or photodegradation reaction. The photoreactive group is preferably a group having a saturated group, in particular a double bond, and particularly preferably a group having at least one selected from the group consisting of a carbon-carbon double bond (C=C bond), a carbon-nitrogen double bond (C=N bond), a nitrogen-nitrogen double bond (N=N bond) and a carbon-oxygen double bond (C=O bond).

Examples of the photoreactive group having a C=C bond include a vinyl group, a polyene group, a stilbene group, a stilbazole group, a stilbazolium group, a chalcone group and a cinnamoyl group. Examples of the photoreactive group having a C=N group include a group having a structure of a Schiff base, an aromatic hydrazone or the like. Examples of the photoreactive group having a N=N bond include an azobenzene group, an azonaphthalene group, an aromatic heterocyclic azo group, an azobis group, formazan group and a group having an azoxybenzene structure. Examples of the photoreactive group having a C=O bond include a benzophenone group, a coumalin group, an anthraquinone group and a maleimide group. These groups may also have a substituent group such as an alkyl group, an alkoxy group, an aryl group, an allyloxy group, a cyano group, an alkoxycarbonyl group, a hydroxyl group, a sulfonate group or a halogenated alkyl group.

As the photoreactive group, a group involved in photodimerization reaction or photocrosslinking reaction is preferable in view of its superior orientation. Among them, a group involved in photodimerization reaction is preferable, and in view that an applying amount of a polarization light required for orientation is relatively low and that a photo-orientation film having thermal and temporal stabilities is easily obtained, a cinnamoyl group and a chalcone group are preferable. The polymer having a photoreative group particularly preferably has a cinnamoyl group such that a terminal part of a side chain of the polymer has a cinnamic acid structure.

By applying the composition for forming a photo-orientation film on a substrate, it is possible to form an optical orientation-induced layer on the substrate. Examples of a solvent contained in the composition include the same solvents as those contained in the above anisotropic polymer composition, and the solvent can be selected depending on a solubility of the polymer or monomer having a photoreactive group.

The amount of the polymer or monomer having a photoreactive group in the composition for forming a photo-orientation film can be adjusted depending on the type of the polymer or monomer and the targeted thickness of the photo-orientation film. The amount is preferably at least 0.2% by mass, and more preferably in a range of 0.3 to 10% by mass. Unless the performance of the photo-orientation film is remarkably impaired, the composition for forming a photo-orientation film may also comprise a polymer material such as polyvinyl alcohol or a polyimide and a photosensitizer.

Examples of a method for applying the composition for forming a photo-orientation film to a substrate include the same methods as the methods for applying the anisotropic polymer composition to a substrate. Examples of a method for removing a solvent from the applied composition for forming a photo-orientation film include the same methods as the methods for removing a solvent from the anisotropic polymer composition.

In applying a polarization light, it is possible either to apply the polarization light directly to the composition for forming a photo-orientation film, which is applied on a substrate, after a solvent is removed, or to apply a polarization light through a substrate by applying the polarization light from a side of the substrate. The polarization light is preferably a substantially parallel light. The wavelength of the light applied is preferably in such a wavelength range that the polymer or monomer having a photoreactive group may incorporate optical energy. Specially, UV (ultraviolet light) in a wavelength range of 250 to 400 nm is particularly preferable. Examples of a light source for applying the polarization light include a xenon lamp, a high-pressure mercury lamp, an extra high-pressure mercury lamp, a metal halide lamp, ultraviolet laser such as KrF and ArF, and the like. Among them, a high-pressure mercury lamp, an extra high-pressure mercury lamp and a metal halide lamp are preferable, since an emission intensity of an ultraviolet light with a wavelength of 313 nm is high. A polarized UV can be applied by applying a light from the light source through a suitable polarization layer. Examples of the polarization layer include a polarization prism such as a polarized filter, a Glan-Thomson and a Glan-Taylor, and also a wire grid-type polarizer.

In applying the polarization light, it is also possible to form an orientation film having multiple areas (patterns) with different orientation directions by a masking treatment.

<Groove Orientation Film>

A groove orientation film is a film having an unevenness pattern or multiple grooves on its surface. When a liquid crystal compound is arranged on a film having multiple liner grooves at equal intervals, the liquid crystal compound is oriented in the direction along the grooves.

Examples of a method for obtaining the groove orientation film include a method in which after exposure on a surface of a photoreactive polyimide film through an exposure mask having a slit in a pattern form, development and rinsing treatments are carried out to form an evenness pattern; a method in which a UV-curable resin layer before cured is formed on a plate-shaped base board having grooves on its surface, and the resin layer is transmitted onto a substrate and then cured; a method in which a film of a UV-curable resin before cured, which is formed on a substrate, is pressed onto a roll-shaped base board having multiple grooves to form unevenness and then cured; and the like. Specific examples of the methods include the methods described in JP 06-34976 A, JP 2011-242743 A and the like.

Among the above-mentioned methods, preferable is a method in which a film of a UV-curable resin before cured, which is formed on a substrate, is pressed onto a roll-shaped base board having multiple grooves to form unevenness and then cured. The roll-shaped base board preferably a stainless (SUS) steel, in view of durability.

Examples of the UV-curable resin include a monofunctional acrylate, a polyfunctional acrylate and the mixture thereof. The monofunctional acrylate is a compound having one group selected from the group consisting of an acryloyloxy group ($CH_2$=CH—COO—) and a methacryloyloxy group ($CH_2$=C($CH_3$)—COO—) (hereinafter, also referred to as a (meth)acryloyloxy group). "(Meth)acrylate" means acrylate or methacrylate.

Examples of the monofunctional acrylate having one (meth)acryloyloxy group include an alkyl (meth)acrylate having 4 to 16 carbon atoms, a β-carboxyalkyl (meth)acrylate having 2 to 14 carbon atoms, an alkylated phenyl (meth)acrylate having 2 to 14 carbon atoms, methoxypolyethylene glycol (meth)acrylate, phenoxypolyethylene glycol (meth)acrylate and isobonyl (meth)acrylate.

The polyfunctional acrylate is a compound having two or more of (meth)acryloyloxy groups, and preferably a compound having 2 to 6 of (meth)acryloyloxy groups.

Examples of the polyfunctional acrylate having two (meth)acryloyloxy groups include 1,3-butanediol di(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bis(acryloyloxyethyl)ether of bisphenol A; ethoxylated bisphenol A di(meth)acrylate; propoxylated neopentyl glycol di(meth)acrylate; ethoxylated neopentyl glycol di(meth)acrylate, 3-methylpentanediol di(meth)acrylate.

Examples of the polyfunctional acrylate having 3 to 6 of (meth)acryloyloxy groups include trimethylolpropane tri(meth)acrylate; pentaerythritol tri(meth)acrylate; tris(2-hydroxyethyl)isocyanurate tri(meth)acrylate; ethoxylated trimethylolpropane tri(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol penta(meth)acrylate; tripentaerythritol hexa(meth)acrylate; tripentaerythritol hepta(meth)acrylate; tripentaerythritol octa(meth)acrylate; a reaction product of pentaerythritol tri(meth)acrylate with an acid anhydride; a reaction product of dipentaerythritol penta(meth)acrylate with an acid anhydride; a reaction product of tripentaerythritol hepta(meth)acrylate with an acid anhydride; caprolactone-modified trimethylolpropane tri(meth)acrylate; caprolactone-modified pentaerythritol tri(meth)acrylate; caprolactone-modified tris(2-hydroxyethyl)isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reaction product of caprolactone-modified pentaerythritol tri(meth)acrylate with an acid anhydride; a reaction product of caprolactone-modified dipentaerythritol penta(meth)acrylate with an acid anhydride; and a reaction product of caprolactone-modified tripentaerythritol hepta(meth)acrylate with an acid anhydride.

The "caprolactone-modified" refers to that a ring-opened body or a ring-opened polymer of caprolactone is introduced between an alcohol-derived moiety and a (meth)acryloyloxy group of a (meth)acrylate compound.

The polyfunctional acrylate is available in the market. Examples of the commercially available thereof include A-DOD-N, A-HD-N, A-NOD-N, APG-100, APG-200, APG-400, A-GLY-9E, A-GLY-20E, A-TMN-3, A-TMPT, AD-TMP, ATM-35E, A-TMMT, A-9550, A-DPH, HD-N, NOD-N, NPG and TMPT (manufactured by Shin-Nakamura Chemical Co., Ltd.); ARONIX M-220, M-325, M-240, M-270, M-309, M-310, M-321, M-350, M-360, M-305, M-306, M-450, M-451, M-408, M-400, M-402, M-403, M-404, M-405 and M-406 (manufactured by Toagosei Co., Ltd.); EBECRYL 11, 145, 150, 40, 140 and 180, DPGDA, HDDA, TPGDA, HPNDA, PETIA, PETRA, TMPTA, TMPEOTA, DPHA and EBECRYL series (manufactured by Daicel-cytec).

In order to obtain an orientation with little orientation disturbance, the width of the protrusion of the groove orientation film is preferably from 0.05 μm to 5 μm, the width of the recess is preferably from 0.1 μm to 5 μm, and the gap depth of the evenness is preferably 2 μm or less and more preferably from 0.01 μm to 1 μm.

<Composition for Forming Optically Anisotropic Film>

The composition for forming an optically anisotropic film comprises a polymerizable liquid crystal compound, a photopolymerization initiator and a solvent.

<Polymerizable Liquid Crystal Compound>

Examples of the polymerizable liquid crystal compound include a compound having a group represented by formula (X) and having a maximum absorption wavelength in a range of 250 nm to 370 nm (hereinafter, also referred to as "compound (X)"):

$$P^{11}\text{-}B^{11}\text{-}E^{11}\text{-}B^{12}\text{-}A^{11}\text{-}B^{13}\text{-} \quad (X)$$

wherein $P^{11}$ represents a hydrogen atom or a polymerizable group, $A^{11}$ represents a divalent alicyclic hydrocarbon group or a divalent aromatic hydrocarbon group, wherein a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and wherein a hydrogen atom of the alkyl group having 1 to 6 carbon atoms and of the alkoxy group having 1 to 6 carbon atoms may be substituted with a fluorine atom, $B^{11}$ represents —O—, —S—, —CO—O—, —O—CO—, —O—CO—O—, —CO—NR$^{16}$—, —NR$^{16}$—CO—, —CO—, —CO—, —CS— or a single bond, wherein R$^{16}$ represents a hydrogen atom or an alkyl group having 1 to 6 carbon atoms, $B^{12}$ and $B^{13}$ each independently represent —C=C—, —CH=CH—, —CH$_2$—CH$_2$—, —O—, —S—, —C—, —C(=O)—O—, —O—C(=O)—, —O—C(=O)—O—, —CH—N—, —N=CH—, —N=N—, —C(=O)—NR$^a$—, —NR$^{16}$—C(=O)—, —OCH$_2$—, —OCF$_2$—, —CH$_2$O—, —CF$_2$O—, —CH=CH—C(=O)—O—, —O—C(=O)—CH=CH— or a single bond, and $E^{11}$ represents an alkanediyl group having 1 to 12 carbon atoms, wherein a hydrogen atom of the alkanediyl group may be also substituted with an alkoxy group having 1 to 5 carbon atoms, a hydrogen atom contained in the alkoxy group may be also substituted with a halogen atom, and —CH$_2$— constituting the alkanediyl group may be also substituted with —O— or —CO—. It is also possible to use the polymerizable liquid crystal compound alone, or to combine multiple compounds having different structures.

The carbon number of the divalent alicyclic hydrocarbon group and divalent aromatic hydrocarbon group represented by A$^{11}$ is preferably in a range of 3 to 18, more preferably in a range of 5 to 12, and particularly preferably 5 or 6. All is preferably cyclohexane-1,4-diyl group or 1,4-phenylene group.

The alkanediyl group having 1 to 12 carbon atoms represented by E$^{11}$ is preferably a liner alkanediyl group having 1 to 12 carbon atoms, wherein —CH$_2$— constituting the alkanediyl group having 1 to 12 carbon atoms may be also substituted with —O—.

Specific examples thereof include liner alkanediyl groups having 1 to 12 carbon atoms such as methylene group, ethylene group, propane-1,3-diyl group, butane-1,4-diyl group, pentane-1,5-diyl group, hexane-1,6-diyl group, heptane-1,7-diyl group, octane-1,8-diyl group, nonane-1,9-diyl group, decane-1,10-diyl group, undecane-1,1-diyl group and dodecane-1,12-diyl group; —CH$_2$—CH$_2$—O—CH$_2$—CH$_2$—, —CH$_2$—CH$_2$—O—CH$_2$—CH$_2$—O—CH$_2$—CH$_2$—, and —CH$_2$—CH$_2$—O—CH$_2$—CH$_2$—O—CH$_2$—CH$_2$—O—CH$_2$—CH$_2$—.

$B^{11}$ is preferably —O—, —S—, —CO—O— or —O—CO—, and among them, —CO—O— is more preferable.

$B^{12}$ and $B^{13}$ are preferably, each independently, —O—, —S—, —C(=O)—, —C(=O)—O—, —O—C(=O)— or —O—C(=O)—O—, and among them, —O— or —O—C(=O)—O— is more preferable.

As the polymerizable group represented by P$^{11}$, in view that a photopolymerization reaction tends to take place, preferable is a radically polymerizable group or a cationically polymerizable group, and in view of an easy handling and an easiness to produce a polymerizable liquid crystal compound, the polymerizable group is preferably a stilbene group or a group represented by the following formulae (P-11) to (P-15):

(P-11)

(P-12)

(P-13)

(P-14)

(P-15)

wherein

R$^{17}$ to R$^{21}$ each independently represent an alkyl group having 1 to 6 carbon atoms or a hydrogen atom.

Specific examples of the group represented by formulae (P-11) to (P-13) include a p-stilbene group and groups represented by the following formulae (P-16) to (P-20).

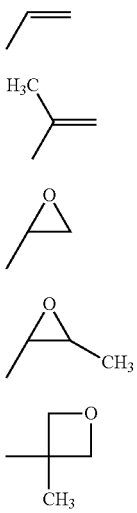

(P-16)

(P-17)

(P-18)

(P-19)

(P-20)

$P^{11}$ is preferably a group represented by formulae (P-14) to (P-20), and more preferably a vinyl group, an epoxy group or an oxetanyl group. The group represented by $P^{11}\text{-}B^{11}$— is further preferably an acryloyloxy group or a methacryloyloxy group.

Examples of compound (X) include a compound represented by formulae (I), (II), (III), (IV), (V) and (VI):

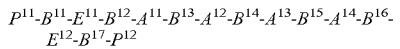 (I)

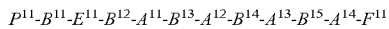 (II)

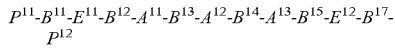 (III)

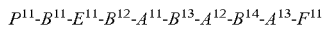 (IV)

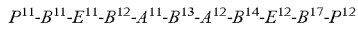 (V)

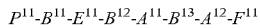 (VI)

wherein $A^{12}$ to $A^{14}$ each independently are defined in the same manner as $A^{11}$, $B^{14}$ to $B^{16}$ each independently are defined in the same manner as $B^{12}$, $B^{17}$ is defined in the same manner as $B^{11}$, and $E^{12}$ is defined in the same manner as $E^{11}$, $F^{11}$ represents a hydrogen atom, an alkyl group having 1 to 13 carbon atoms, an alkoxy group having 1 to 13 carbon atoms, a cyano group, a nitro group, a trifluoromethyl group, a dimethylamino group, a hydroxy group, a methylol group, a formyl group, a sulfo group (—SO$_3$H), a carboxy group, an alkoxycarbonyl group having 1 to 10 carbon atoms or a halogen atom, wherein —CH$_2$— constituting the alkyl group and alkoxy group may be also substituted with —O—, and $P^{12}$ represents a hydrogen atom or a polymerizable group, and preferably a polymerizable group, and examples thereof include the polymerizable groups described above for $P^{11}$, and at least one of $P^{11}$ and $P^{12}$ is a polymerizable group.

Specific examples of the polymerizable liquid crystal compound include liquid a compound having a polymerizable group and having a maximum absorption wavelength in 250 nm to 370 nm in the compounds described in "3.8.6 Network (Complete crosslink type)" and "6.5.1 Liquid crystal material b. Polymerizable nematic liquid crystal material" in "Liquid crystal handbook" (edited by editorial committee of Liquid crystal handbook, Maruzen Co., Ltd., Oct. 30, 2000), JP 2010-31223 A, JP 2010-270108 A, JP 2011-6360 A and JP 2011-207765 A.

Specific examples of compound (X) include compounds represented by the following formulae (I-1) to (I-4), formulae (II-1) to (II-4), formulae (III-1) to (III-22), formulae (IV-1) to (IV-19), formulae (V-1) to (V-2) and formulae (VI-1) to (VI-6). In the following formulae, k1 and k2 each independently represent an integer from 2 to 12. In view of easy synthesis and availability, preferable are compounds (X) represented by formulae (I-1) to (I-4), formulae (II-1) to (II-4), formulae (III-1) to (III-26), formulae (IV-1) to (IV-26), formulae (V-1) to (V-2) and formulae (VI-1) to (VI-6).

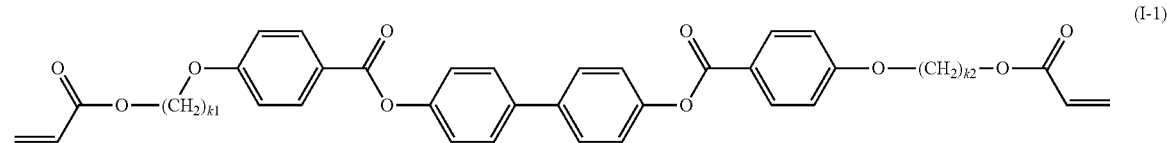

(I-1)

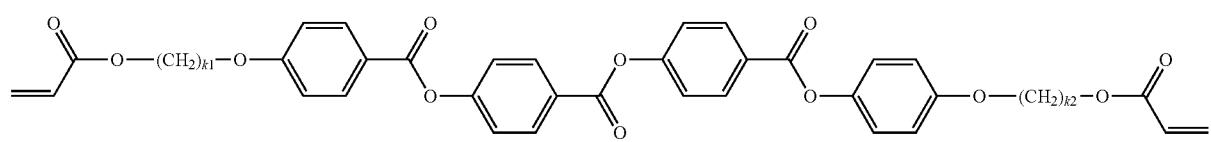

(I-2)

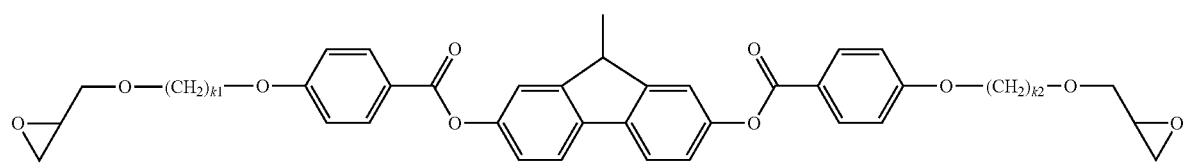

(I-3)

-continued
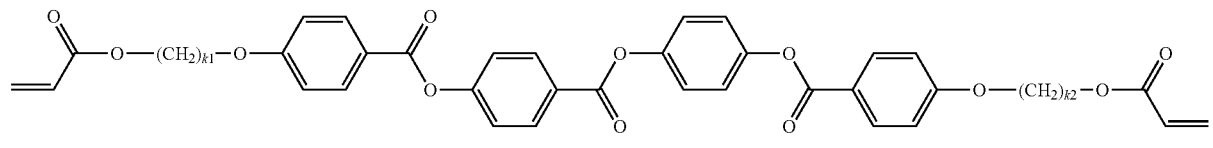
(I-4)
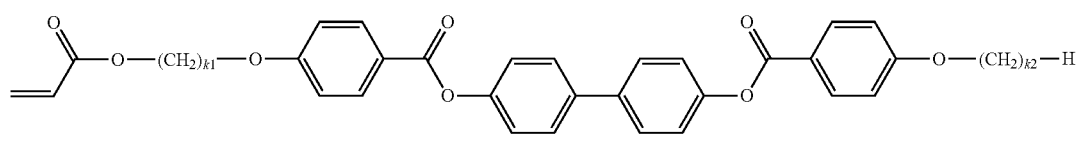
(II-1)
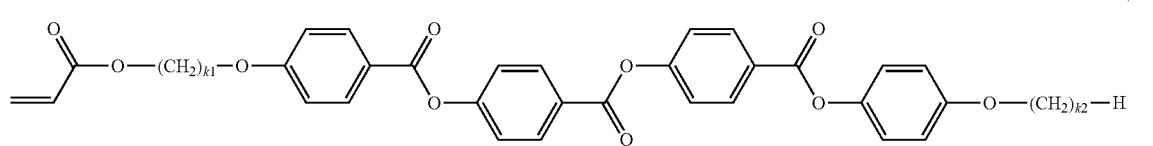
(II-2)
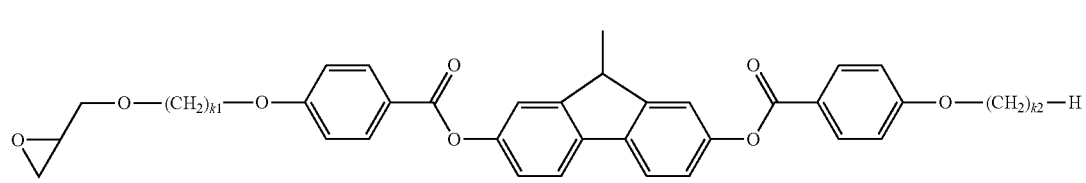
(II-3)
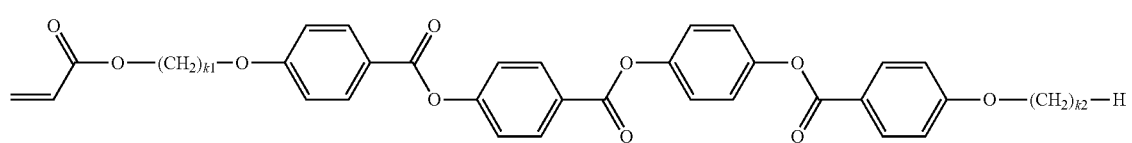
(II-4)
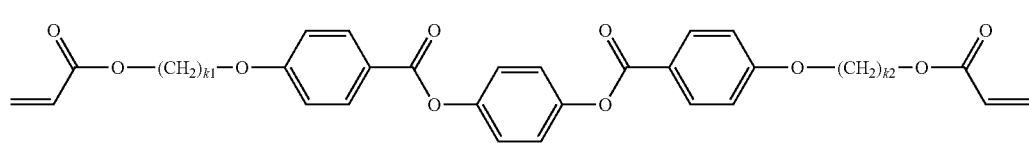
(III-1)
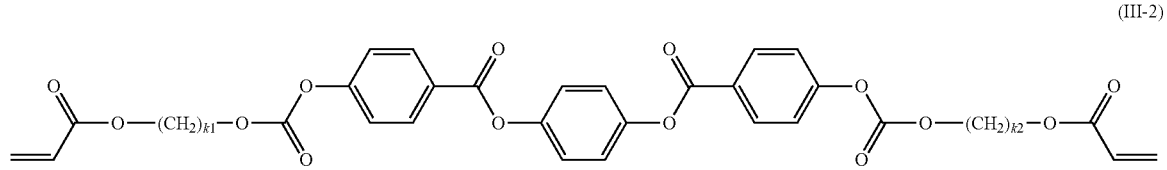
(III-2)
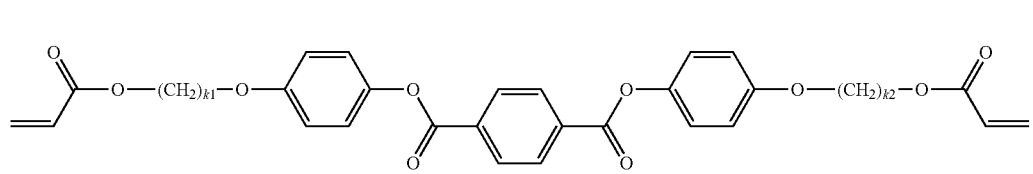
(III-3)
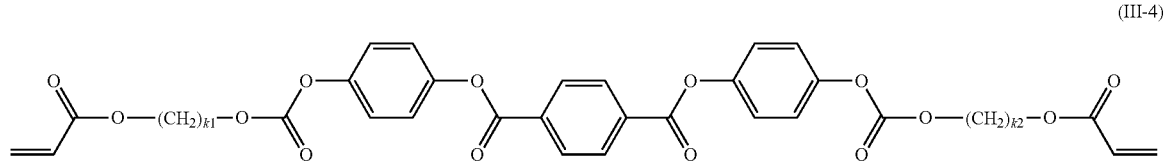
(III-4)
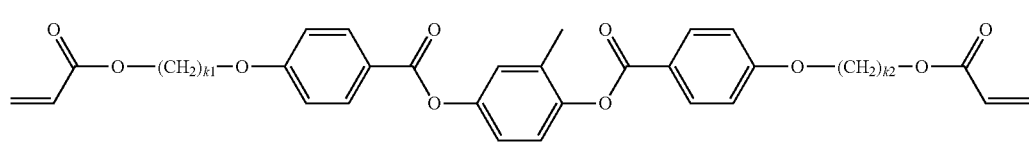
(III-5)

-continued
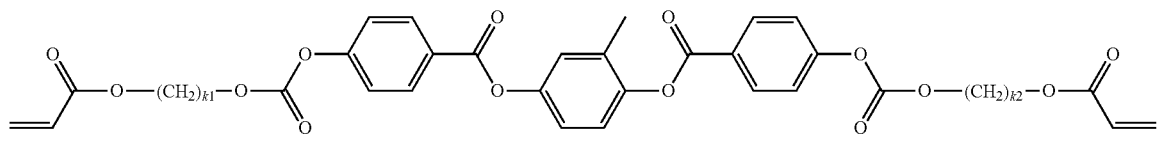
(III-6)
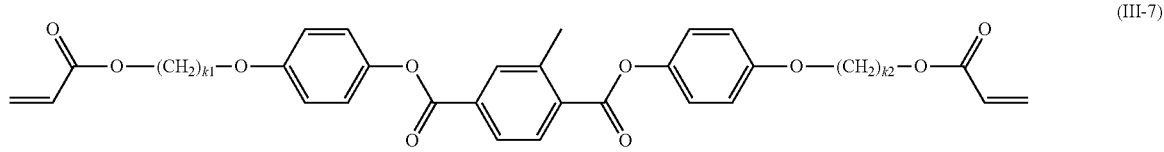
(III-7)
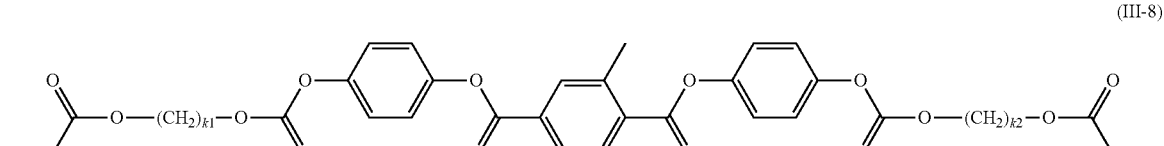
(III-8)
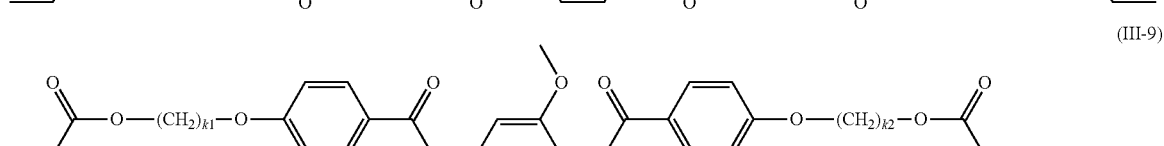
(III-9)
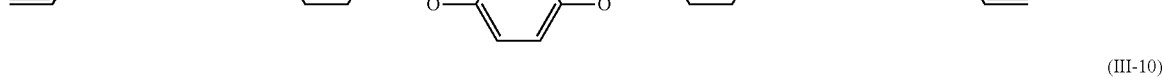
(III-10)
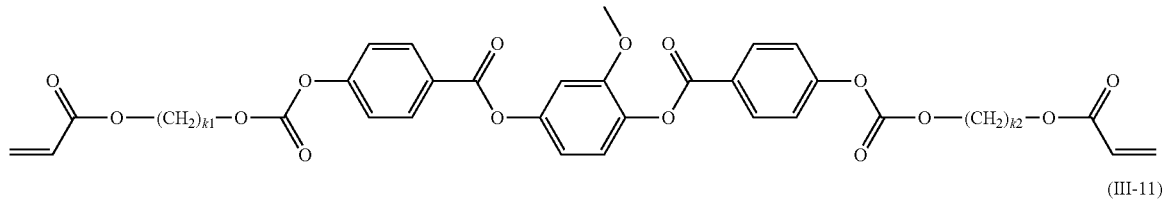
(III-11)
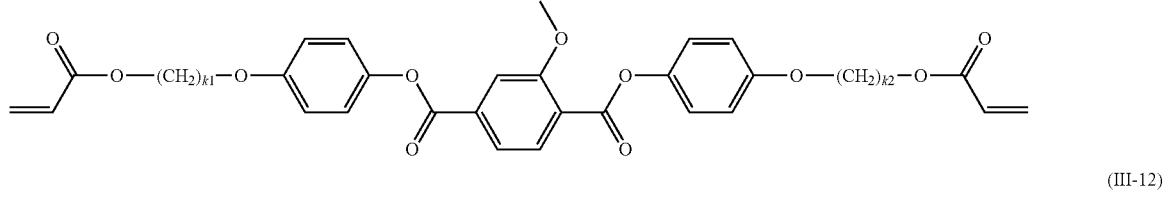
(III-12)
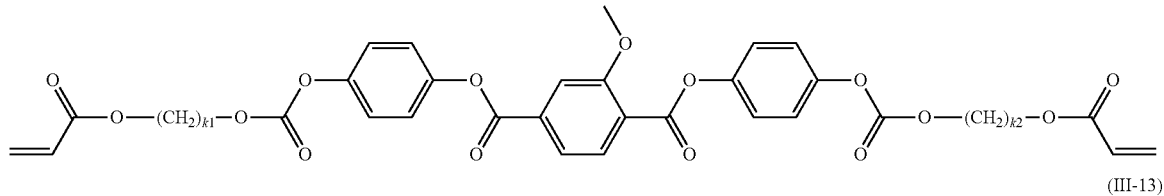
(III-13)
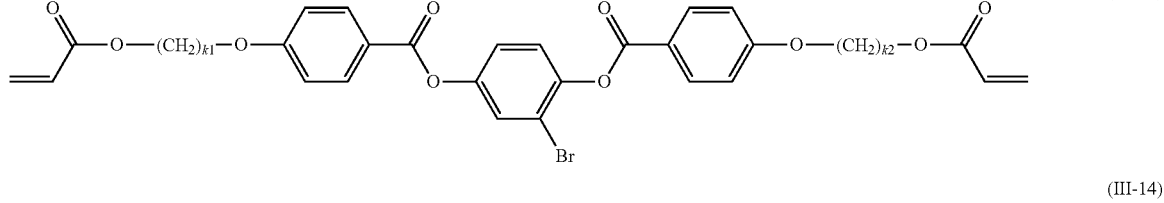
(III-14)
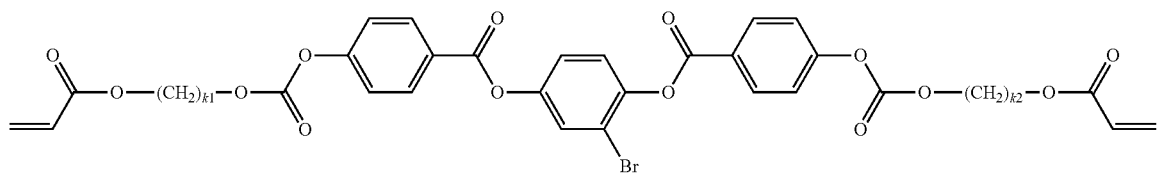

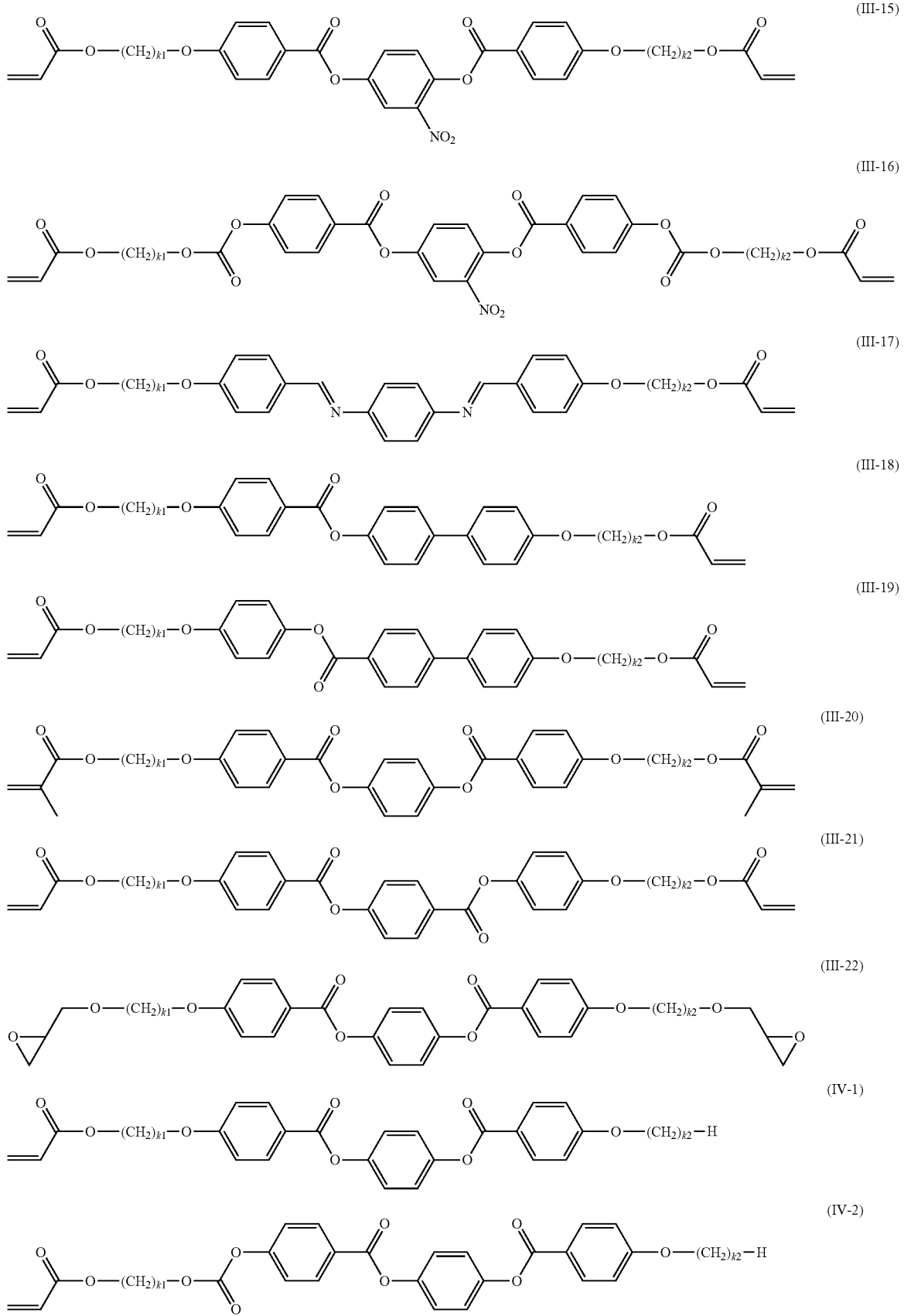

-continued
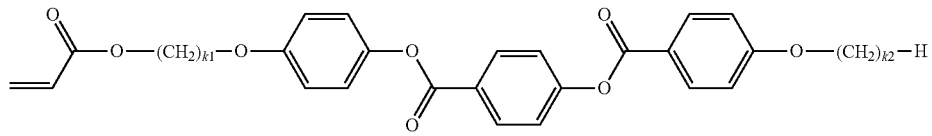 (IV-3)
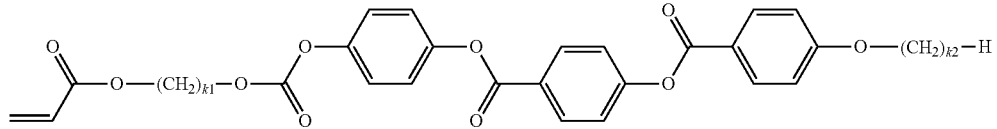 (IV-4)
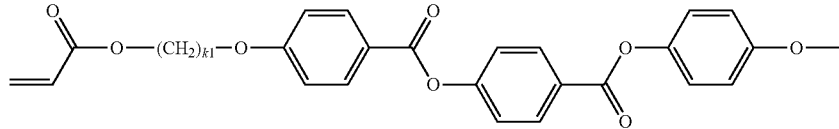 (IV-5)
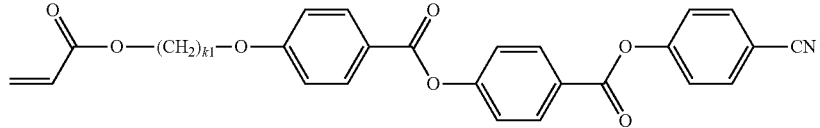 (IV-6)
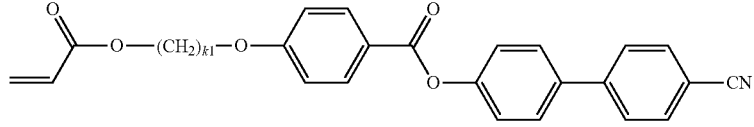 (IV-7)
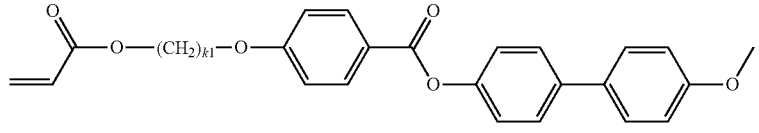 (IV-8)
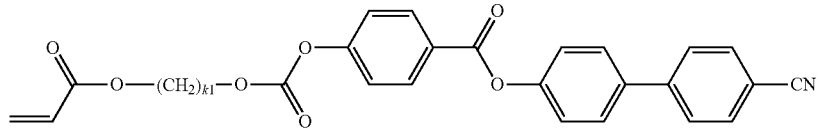 (IV-9)
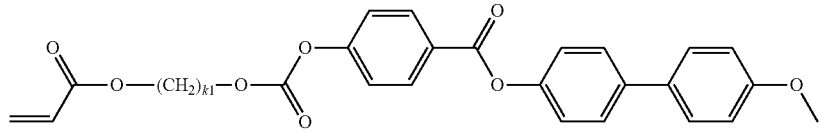 (IV-10)
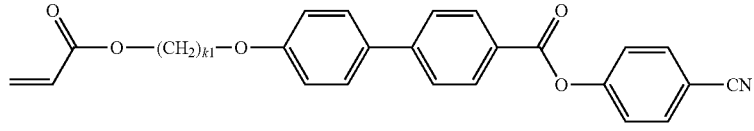 (IV-11)
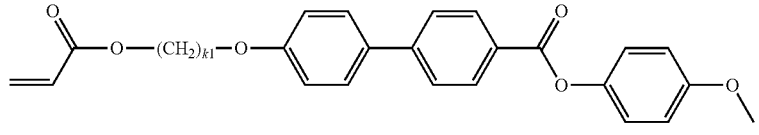 (IV-12)
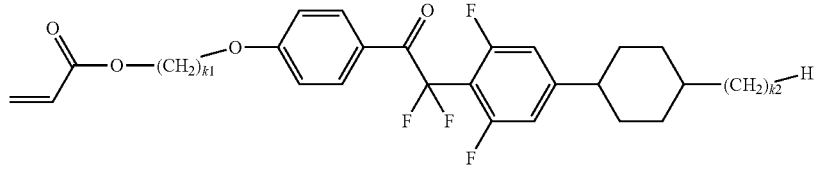 (IV-13)

-continued
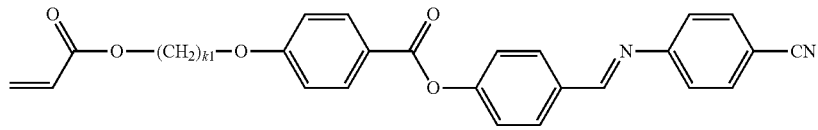
(IV-14)
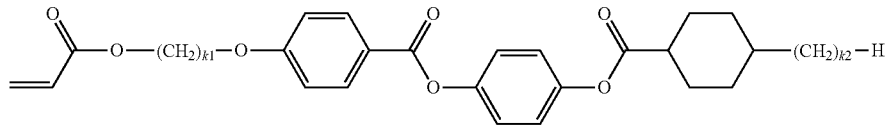
(IV-15)
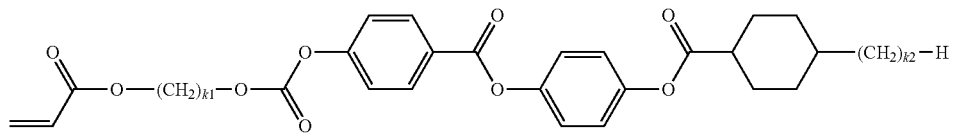
(IV-16)
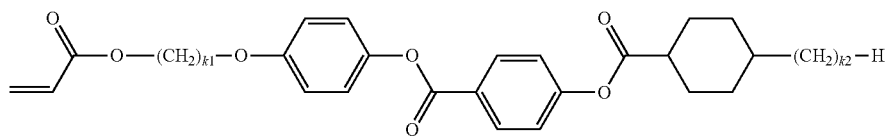
(IV-17)
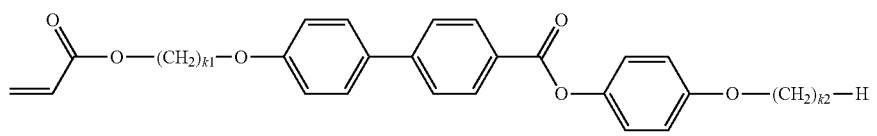
(IV-18)
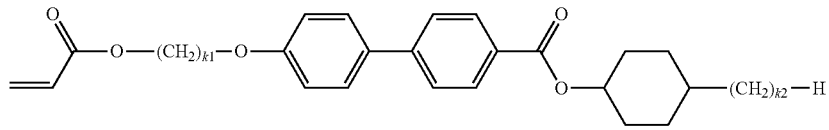
(IV-19)
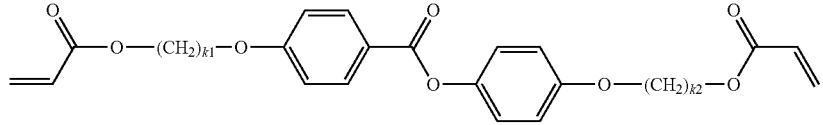
(V-1)
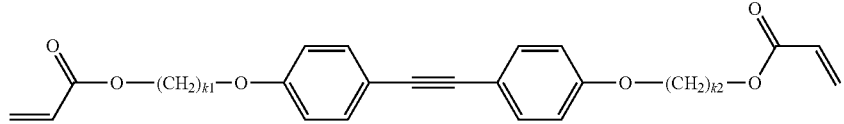
(V-2)
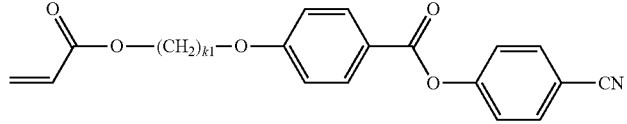
(VI-1)
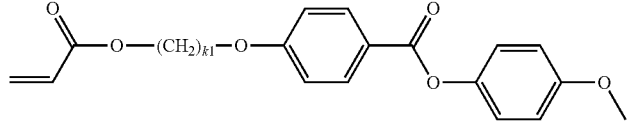
(VI-2)
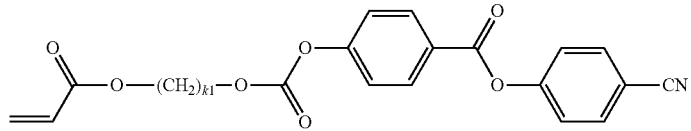
(VI-3)

-continued

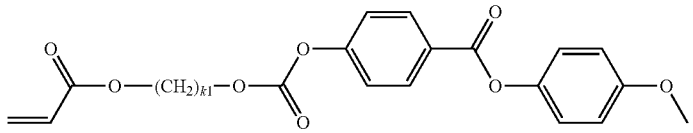
(VI-4)

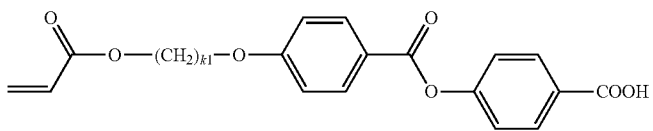
(VI-5)

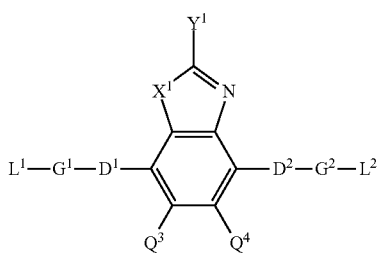
(VI-6)

In addition, examples of the polymerizable liquid crystal compound also include compounds represented by formula (A) and having a maximum absorption wavelength in 250 nm to 370 nm (hereinafter, also referred to as "compound (A)"):

$$L^1-G^1-D^1\underset{Q^3}{\overset{X^1}{\underset{\phantom{X}}{\diagdown}}}\underset{Q^4}{\overset{Y^1}{\phantom{X}}}D^2-G^2-L^2 \quad (A)$$

wherein $X^1$ represents an oxygen atom, a sulfur atom or $NR^1$—, where $R^1$ represents a hydrogen atom or an alkyl group having 1 to 4 carbon atoms, $Y^1$ represents a monovalent aromatic hydrocarbon group having 6 to 12 carbon atoms and optionally having a substituent, or a monovalent aromatic heterocyclic group having 3 to 12 carbon atoms and optionally having a substituent, $Q^3$ and $Q^4$ each independently represent a hydrogen atom, a monovalent aliphatic hydrocarbon group having 1 to 20 carbon atoms and optionally having a substituent, a monovalent alicyclic hydrocarbon group having 3 to 20 carbon atoms, a monovalent aromatic hydrocarbon group having 6 to 20 carbon atoms and optionally having a substituent t, a halogen atom, a cyano group, a nitro group, —$NR^2R^3$ or —$SR^2$, or $Q^3$ and $Q^4$ are bonded to each other to form an aromatic ring or a heteroaromatic ring with the carbon atoms to which $Q^3$ and $Q^4$ are bonded, wherein $R^2$ and $R^3$ each independently represent a hydrogen atom or an alkyl group having 1 to 6 carbon atoms, $D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, $CR^4R^5$—O—$CR^6R^7$—, —CO—O—$CR^4R^5$—, —O—CO—$CR^4R^5$—, —$CR^4R^5$—O—CO—$CR^6R^7$—, —$CR^4R^5$—CO—O—$CR^6R^7$—, —$NR^4$—$CR^5R^6$— or —CO—$NR^4$—, wherein $R^4$, $R^5$, $R^6$ and $R^7$ each independently represent a hydrogen atom, a fluorine atom or an alkyl group having 1 to 4 carbon atoms, $G^1$ and $G^2$ each independently represent a divalent alicyclic hydrocarbon group having 5 to 8 carbon atoms, wherein any methylene group constituting the alicyclic hydrocarbon group is optionally replaced by an oxygen atom, a sulfur atom or —NH—, and wherein any methine group constituting the alicyclic hydrocarbon group is optionally replaced by a tertiary nitrogen atom, and $L^1$ and $L^2$ each independently represent a monovalent organic group, wherein at least one of $L^1$ and $L^2$ has a polymerizable group. Preferable is a compound represented by formula (A) wherein $L^1$ is a group represented by formula (A1) and $L^2$ is a group represented by formula (A2):

$$P^1-F^1-(B^1-A^1)_k-E^1- \quad (A^1)$$

$$P^2-F^2-(B^2-A^2)_l-E^2- \quad (A^2)$$

wherein $B^1$, $B^2$, $E^1$ and $E^2$ each independently represent —$CR^4R^5$—, —$CH_2$—$CH_2$—, —O—, —S—, —CO—O—, —O—CO—O—, —CS—O—, —O—CS—O—, —CO—$NR^1$—, —O—$CH_2$—, —S—$CH_2$— or a single bond, $A^1$ and $A^2$ each independently represent a divalent alicyclic hydrocarbon group having 5 to 8 carbon atoms or a divalent aromatic hydrocarbon group having 6 to 18 carbon atoms, wherein any methylene group constituting the alicyclic hydrocarbon group is optionally replaced by an oxygen atom, a sulfur atom or —NH—, and wherein any methine group constituting the alicyclic hydrocarbon group is optionally replaced by a tertiary nitrogen atom, k and l each independently represent an integer from 0 to 3, $F^1$ and $F^2$ each independently represent a divalent aliphatic hydrocarbon group having 1 to 12 carbon atoms, $P^1$ represents a polymerizable group, $P^2$ represents a hydrogen atom or a polymerizable group, and $R^4$ and $R^5$ each independently represent a hydrogen atom, a fluorine atom or an alkyl group having 1 to 4 carbon atoms.

Examples of compound (A) include a polymerizable liquid crystal compound described in JP 2011-207765 A.

The maximum absorption wavelength of the polymerizable liquid crystal compound is more preferably from 250 nm to 350 nm, and further preferably from 250 nm to 300 nm. It is preferable that the range of the maximum absorption wavelength is not within a range of 380 nm to 780 nm, which corresponds to a visible range, since the obtained optically anisotropic film is less colored and it is difficult to prevent a reaction of the photopolymerization initiator.

The content of the polymerizable liquid crystal compound in the composition for forming an optically anisotropic film is generally from 5 to 50 parts by mass, and preferably from 10 to 30 parts by mass, relative to 100 parts by mass of the composition for forming an optically anisotropic film.

<Phctopolymerization Initiator>

The photopolymerization initiator is preferably a photopolymerization initiator which generates a radical due to light radiation.

Examples of the photopolymerization initiator include a benzoin compound, a benzophenone compound, a benzyl ketal compound, an α-hydroxyketone compound, an α-aminoketone compound, an α-acetophenone compound, a triazine compound, an iodonium salt and a sulfonium salt. Specific examples thereof include Irgacure® 907, Irgacure® 184, Irgacure® 651, Irgacure® 819, Irgacure® 250, Irgacure® 369 (manufactured by Ciba Japan K.K.); SEIKUOL® BZ, SEIKUOL® Z, SEIKUOL® BEE (manufactured by Seiko Chemical Co., Ltd); Kayacure® BP100 (manufactured by Nippon Kayaku Co., Ltd.); Kayacure UVI-6992 (manufactured by Dow); Adekaoptomer® SP-152, Adekaoptomer® SP-170 (manufactured by ADEKA Corporation); TAZ-A, TAZ-PP (manufactured by Nihon Siber Hegner); and TAZ-104 (manufactured by SANWA Chemical). Among them, an α-acetophenone compound is preferable. Examples of the α-acetophenone compound include 2-methyl-2-morpholino-1-(4-methylsulfanilphenyl)propan-1-on, 2-dimethylamino-1-(4-morpholinophenyl)-2-benzylbutan-1-on and 2-dimethylamino-1-(4-morpholinophenyl)-2-(4-methylphenylmethyl)butan-1-on. The α-acetophenone compound is more preferably 2-methyl-2-morpholino-1-(4-methylsulfanilphenyl)propan-1-on or 2-dimethylamino-1-(4-morpholinophenyl)-2-benzylbutan-1-on. Examples of a commercially available product of the α-acetophenone compound include Irgacure® 369, 379EG and 907 (manufactured by BASF Japan), and also SEIKUOL® BEE (manufactured by Seiko Chemical Co., Ltd).

The maximum absorption wavelength of the photopolymerization initiator is preferably from 300 nm to 380 nm and more preferably from 300 nm to 360 nm, in view that the energy emitted from the light source can be sufficiently utilized and the productivity is superior.

In order to polymerize the polymerizable liquid crystal compound without disturbing an orientation of the polymerizable liquid crystal compound, the content of the polymerization initiator is generally from 0.1 to 30 parts by mass, and preferably from 0.5 to 10 parts by mass, relative to 100 parts by mass of the polymerizable liquid crystal compound.

<Solvent>

As a solvent, preferable is an organic solvent which can dissolve the components of the composition for forming an optically anisotropic film such as the polymerizable liquid crystal compound, and more preferable is a solvent which can dissolve the components of the composition for forming an optically anisotropic film such as the polymerizable liquid crystal compound and which is inert to a polymerization reaction of the polymerizable liquid crystal compound.

Specific examples thereof include alcohol solvents such as methanol, ethanol, ethylene glycol, isopropyl alcohol, propylene glycol, methyl cellosolve, butyl cellosolve, propylene glycol monomethyl ether and phenol; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; non-chlorinated aliphatic hydrocarbon solvents such as pentane, hexane and heptane; non-chlorinated aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more of the solvents. Among them, preferable are alcohol solvents, ester solvents, ketone solvents, non-chlorinated aliphatic hydrocarbon solvents and non-chlorinated aromatic hydrocarbon solvents.

The content of the solvent is preferably from 10 to 10000 parts by mass, and more preferably from 100 to 5000 parts by mass, relative to 100 parts by mass of a solid content. The concentration of the solid content in the composition for forming an optically anisotropic film is generally from 1 to 90% by mass, preferably from 2 to 50% by mass, and more preferably from 5 to 50% by mass. The "solid content" refers to the total of the components obtained by removing the solvent from the composition for forming an optically anisotropic film.

Additionally, the composition for forming an optically anisotropic film may also comprise a polymerization inhibitor, a photosensitizer, a leveling agent, a chiral agent, a reactive additive and the like.

<Polymerization Inhibitor>

According to the polymerization inhibitor, it is possible to control the polymerization reaction of the polymerizable liquid crystal compound.

Examples of the polymerization inhibitor include hydroquinone and hydroquinones having a substituent group such as alkyl ether group; catechols having an alkyl ether such as butyl catechol; a radical scavenger such as phyrogallols, 2,2,6,6-tetramethyl-1-piperidinyloxy radical; thiophenols; β-naphthylamines and β-naphthols.

In order to polymerize the polymerizable liquid crystal compound without disturbing an orientation of the polymerizable liquid crystal compound, the content of the polymerization inhibitor is generally from 0.1 to 30 parts by mass, and preferably from 0.5 to 10 parts by mass, relative to 100 parts by mass of the polymerizable liquid crystal compound.

<Photosensitizer>

Examples of the photosensitizer include xanthones such as xanthone and thioxanthone; anthracene and anthracenes having a substituent group such as alkyl ether group; phenothiazine; and rubrene.

By using the photosensitizer, it is possible to make the photopolymerization initiator highly sensitive. The content of the photosensitizer is generally from 0.1 to 30 parts by mass, and preferably from 0.5 to 10 parts by mass, relative to 100 parts by mass of the polymerizable liquid crystal compound.

<Leveling Agent>

Examples of the leveling agent include organically modified silicone oil-based leveling agents, polyacrylate-based leveling agents and perfluoroalkyl-based leveling agents. Specific examples thereof include DC3PA, SH7PA, DC11PA, SH28PA, SH29PA, SH30PA, ST80PA, ST86PA, SH8400, SH8700 and FZ2123 (manufactured by Dow Corning Toray Co., Ltd.); KP321, KP323, KP324, KP326, KP340, KP341, X22-161A and KF6001 (manufactured by Shin-Etsu Chemical Co., Ltd.); TSF400, TSF401, TSF410, TSF4300, TSF4440, TSF4445, TSF-4446, TSF4452 and TSF4460 (manufactured by Momentive Performance Materials Japan LLC); Fluorinert® FC-72, FC-40 and FC-3283 (manufactured by Sumitomo 3M Limited); Megaface R-08, R-30, R-90, F-410, F-411, F-443, F-445, F-470, F-477, F-479, F-482 and F-483 (manufactured by DIC Corporation); F Top (product name) EF301, EF303, EF351 and EF352 (manufactured by Mitsubishi Materials Electronic Chemicals Co., Ltd.); Surflon® S-381, S-382, S-383, S-393, SC-101, SC-105, KH-40 and SA-100 (manufactured by AGC SEIMI CHEMICAL CO., LTD); product names E1830 and E5844 (manufactured by Daikin Fine Chemical Laboratory, Co., Ltd.); and BM-1000, BM-1100, BYK-352, BYK-353 and BYK-361N (product names, manufactured by BM Chemie). It is also possible to combine two or more kinds of the leveling agents.

By using the leveling agent, it is possible to form a smoother optically anisotropic film. In addition, in the course of production of an optically anisotropic film, it is possible to control a flowability of the composition for forming an optically anisotropic film and to adjust a cross-linking density of the optically anisotropic film. The content of the leveling agent is generally from 0.1 to 30 parts by mass, and preferably from 0.1 to 10 parts by mass, relative to 100 parts by mass of the polymerizable liquid crystal compound.

<Chiral Agent>

Examples of the chiral agent include known chiral agents (for example, described in "Liquid crystal handbook", Chapter 3, Section 4-3, Chiral agent for TN and STN, page 199, edit: Japan Society for the Promotion of Science, 142 committee, 1989).

Although a chiral agent generally comprises an asymmetric carbon atom, it is also possible to use an axially asymmetric compound or a planarly asymmetric compound, which have no asymmetric carbon atom, as the chiral agent. Examples of the axially asymmetric compound and the planarly asymmetric compound include binaphthyl, helicene, paracyclophane and the derivatives thereof.

Specific examples of the chiral agent include compounds described in JP 2007-269640 A, JP 2007-269639 A, JP 2007-176870 A, JP 2003-137887 A, JP 2000-515496 A, JP 2007-169178 A and JP 09-506088 A, and the chiral agent is preferably Paliocolors LC756 manufactured by BASF Japan.

In order to polymerize the polymerizable liquid crystal compound without disturbing an orientation of the polymerizable liquid crystal compound, the content of the chiral agent is generally from 0.1 to 30 parts by mass, and preferably from 1.0 to 25 parts by mass, relative to 100 parts by mass of the polymerizable liquid crystal compound.

<Reactive Additive>

The reactive additive preferably has a carbon-carbon unsaturated bond and an active hydrogen reactive group in the molecule. The "active hydrogen reactive group" refers to a group reactive to a group having an active hydrogen such as a carboxyl group (—COOH), a hydroxyl group (—OH), an amino group (—NH$_2$), and typical examples thereof include an epoxy group, an oxazoline group, a carbodimide group, an aziridine group, an imide group, an isocyanate group, a thioisocyanate group and a maleic anhydride group.

In the reactive additive, at least two active hydrogen reactive groups preferably exist, and in this case, the multiple active hydrogen reactive groups may be also identical to or independently different from one another.

The carbon-carbon unsaturated bond contained in the reactive additive may be also a carbon-carbon double bond, a carbon-carbon triple bond or the combination thereof, and is preferably a carbon-carbon double bond. Among them, the reactive additive preferably comprises a vinyl group and/or a (meth)acryl group. Furthermore, the active hydrogen reactive group is preferably selected from at least one of the group consisting of an epoxy group, a glycidy group and an isocyanate group, and is particularly preferably a reactive additive having an acryl group and an isocyanate group.

Specific examples of the reactive additive include a compound having a (meth)acryl group and an epoxy group, such as methacryloxy glycidy ether and acryloxy glycidy ether; a compound having a (meth)acryl group and an oxetane group, such as oxetane acrylate and oxetane methacrylate; a compound having a (meth)acryl group and a lactone group, such as lactone acrylate and lactone methacrylate; a compound having a vinyl group and an oxazoline group, such as vinyl oxazoline and isopropenyl oxazoline; an oligomer of compound having a (meth)acryl group and an isocyanate group such as isocyanatomethyl acrylate, isocyanatomethyl methacrylate, 2-isocyanatoethyl acrylate and 2-isocyanatoethyl methacrylate. In addition, examples thereof include a compound having a vinyl group or a vinylene group and an anhydride, such as methacrylic anhydride, acrylic anhydride, maleic anhydride and vinyl maleic anhydride. Among them, preferable are methacryloxy glycidy ether, acryloxy glycidy ether, isocyanatomethyl acrylate, isocyanatomethyl methacrylate, vinyl oxazoline, 2-isocyanatoethyl acrylate, 2-isocyanatoethyl methacrylate, and the above-mentioned oligomers, and particularly preferable are isocyanatomethyl acrylate, 2-isocyanatoethyl acrylate and the above-mentioned oligomer.

Preferable reactive additive is represented by the following formula (Y):

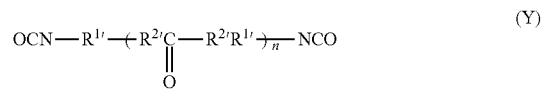

wherein n represents an integer from 1 to 10,

R$^{1'}$ represents a divalent aliphatic or alicyclic hydrocarbon group having 2 to 20 carbon atoms, or a divalent aromatic hydrocarbon group having 5 to 20 carbon atoms, in two R$^{2'}$ contained in each repeating unit, one represents —NH—, and the other represents a group represented by >N—C(=O)—R$^{3'}$, wherein R$^{3'}$ represents a hydroxyl group or a group having a carbon-carbon unsaturated bond, and in case that n is 2 or more, at least one of R$^{3'}$ in multiple groups >N—C(=O)—R$^{3'}$ is preferably a group having a carbon-carbon unsaturated bond.

Among the reactive additives represented by the formula (Y), particularly preferable is a compound represented by the following formula (YY) (hereinafter, also referred to as "compound (YY)"):

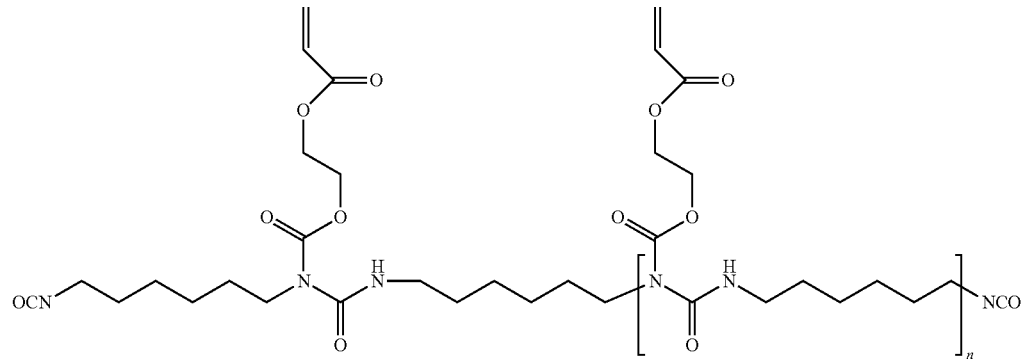

wherein n is defined in the same manner as mentioned above.

Examples of a commercially available product of compound (YY) include Laromer® LR-9000 (manufactured by BASF).

The content of the reactive additive is generally from 0.1 to 30 parts by mass, and preferably from 0.1 to 5 parts by mass, relative to 100 parts by mass of the polymerizable liquid crystal compound.

<Application>

Examples of a method for applying the composition for forming an optically anisotropic film to a substrate include extrusion coating method, direct gravure coating method, reverse gravure coating method, CAP coating method, ink-jet method, dip coating method, slit coating method, die coating method. Examples thereof also include an application method by using a coater such as a dip coater, a bar coater or a spin coater. Among them, in view that continuous application can be carried out in a Roll-to-Roll type, preferable are CAP coating method, ink-jet method, dip coating method, slit coating method, die coating method and an application method with a bar coater. When an application is carried out in a Roll-to-Roll type, it is also possible to form an orientation film on a substrate by applying the composition comprising an anisotropic polymer onto the substrate and additionally to continuously apply the composition for forming an optically anisotropic film to the obtained orientation film.

By applying a light to the composition for forming an optically anisotropic film, which is applied to a substrate, and polymerizing the polymerizable liquid crystal compound, an optically anisotropic film is obtained. When the polymerizable liquid crystal compound contained in the composition for forming an optically anisotropic film, which is applied to the substrate, exhibits a liquid crystal phase such as a nematic phase, the obtained optically anisotropic film has birefringence due to monodomain orientation.

It is also possible to apply a light directly to the applied composition for forming an optically anisotropic film. However, it is preferable to apply a light after drying for removal of a solvent. Although it is also possible to carry out drying (removal of a solvent) in conjunction with the light radiation, it is preferable to remove most of the solvent before the light radiation. The polymerizable liquid crystal compound contained in the applied composition for forming an optically anisotropic film is generally oriented by removing a solvent from the composition for forming an optically anisotropic film to change it into a liquid crystal phase.

Examples of a method for drying include air drying, draught drying, heat drying, vacuum drying and the combination method thereof. Among them, air drying and heat drying are preferable. The drying temperature is preferably from 0 to 250° C., more preferably from 50 to 220° C., and further preferably from 60 to 170° C. The drying time is preferably from 10 seconds to 60 minutes, and more preferably from 30 seconds to 30 minutes.

In the light radiation, applied is light with wavelengths in the range of 200 nm to 500 nm that has an allowable variation range of less than 250 nm in wavelength. As the light applied, preferable is a light having a wavelength of 300 nm to 500 nm, more preferable is a light having a wavelength containing 365 nm, and further preferable is a light having a central wavelength of 365 nm. Among such lights, a light preferably has an allowable variation range of 200 nm or less, further preferably 100 nm or less, and further preferably 30 nm or less in wavelength. Particularly preferable is a bright line consisting only of a light having a wavelength of 365 nm.

By applying such a light, an orientation of the polymerizable liquid crystal compound can be improved, since an excess energy is not applied when the polymerizable liquid crystal compound is polymerized.

It is preferable to apply a light having a wavelength of 300 nm or more, since a light having a wavelength under 300 nm may lead to decomposition of the polymerizable liquid compound and an oriented defect.

It is preferable that the allowable variation range of the radiation wavelength is within 200 nm, since the orientation of the polymerizable liquid crystal compound in the obtained optically anisotropic film is further improved.

It is particularly preferable that the applied light consists only of a bright line having a wavelength of 365 nm, since an oriented defect of the polymerizable liquid crystal compound is particularly suppressed and simultaneously an effect of heat caused by the light radiation can be removed.

Examples of a method for applying the light include a method in which a filter for cutting lights except the light having a desired wavelength is introduced between the light source and the applied composition for forming an optically anisotropic film; and a method of using a light source radiating the above-mentioned light.

Examples of a method for applying a light having the allowable variation range within 200 nm include a method of layering a commercially available long wavelength cut filter and a commercially available short wavelength cut filter and using it; and a method of using a bandpass filter in which the allowable variation range of the transmitting light is controlled.

Examples of a method for applying a bright line having a wavelength of 365 nm include a method of using a cut filter in which a light having a single wavelength is transmitted; a method of using a light source which emits a light having a limited wavelength such as LED.

The time for applying the light is generally from 5 seconds to 10 minutes, preferably from 5 seconds to 2 minutes, more preferably from 5 seconds to 1 minute, and further preferably from 5 seconds to 30 seconds. When the time is within the above range, an optically anisotropic film having more superior transparency can be obtained.

In the production process of the present invention, it is preferable to continuously carry out the steps (A) and (B) on an elongated film roll as a substrate.

The thickness of the optically anisotropic film, which can be adjusted depending on its use, is preferably from 0.1 μm to 10 μm, and in view of reduction of a photoelasticity, further preferably from 0.2 μm to 5 μm.

The optically anisotropic film produced by the production process of the present invention (hereinafter, also referred to as the present optically anisotropic film) may also be layered with the substrate used in the production process of the present invention, or may be also scraped from the substrate and stuck on another optical film or an optical film so as to use it.

The present optically anisotropic film satisfies the following formulae (1) and (2):

$$\Delta n(450)/\Delta n(550) \le 1.00 \quad (1)$$

$$1.00 \le \Delta n(650)/\Delta n(550) \quad (2)$$

wherein $\Delta n(450)$, $\Delta n(550)$ and $\Delta n(650)$ represent birefringence indices for lights with wavelengths of 450 nm, 550 nm and 650 nm, respectively.

In order to satisfy formulae (1) and (2), the above-mentioned compound (A) should be contained as the polymerizable liquid crystal compound. Specific examples thereof include a method described in JP 2011-207765 A.

The present optically anisotropic film preferably has retardation performance.

The present optically anisotropic film can be available as a retardation film to be used for converting a liner polarization light confirmed from an oblique angle of a light emitting side into a circular polarization light or an elliptical polarization light, for converting a circular polarization light or an elliptical polarization light into a liner polarization light, or for converting an orientation direction of a liner polarization light.

By layering a number of the present optically anisotropic film or by combining the present optically anisotropic film with another film, it is possible to use it as a viewing angle compensation film, a viewing angle expansion film, an antireflection film, an orientation film, a circular orientation film, an elliptical orientation film or a luminance-improving film.

By adjusting the amounts of compound (X) and compound (A) contained in the polymerizable liquid crystal compound for forming the present optically anisotropic film, it is possible to prepare retardation of the present optically anisotropic film. Since the retardation value of the present optically anisotropic film (Re($\lambda$)) is determined according to formula (4), $\Delta n(\lambda)$ and film thickness d should be adjusted in order to obtain a desired Re($\lambda$).

$$Re(\lambda) = d \times \Delta n(\lambda) \quad (4)$$

wherein

Re($\lambda$) represents a retardation value in a wavelength of $\lambda$ nm, d represents a film thickness, and $\Delta n(\lambda)$ represents a birefringence index in a wavelength of $\lambda$ nm.

The in-plane retardation value of the present optically anisotropic film for a light having a wavelength of 550 nm is preferably from 90 nm to 180 nm, more preferably from 95 nm to 170 nm, and further preferably from 100 nm to 160 nm.

The present optically anisotropic film is also useful as a component constituting a polarization plate. The polarization plate of the present invention comprises at least one of the present optically anisotropic film.

Specific examples of polarization plate 4 include polarization plates represented in FIG. 1(a) to FIG. 1(e). Polarization plate 4a represented in FIG. 1(a) is a polarization plate in which retardation film 1 and orientation film 2 are directly layered. Polarization plate 4b represented in FIG. 1(b) is a polarization plate in which retardation film 1 and orientation film 2 are stuck via adhesive agent layer 3'. Polarization plate 4c represented in FIG. 1(c) is a polarization plate in which retardation film 1 and retardation film 1' are layered and additionally retardation film 1' and orientation film 2 are layered. Polarization plate 4d represented in FIG. 1(d) is a polarization plate in which retardation film 1 and retardation film 1' are stuck via adhesive agent layer 3 and additionally orientation film 2 is layered on retardation film 1'. Polarization plate 4e represented in FIG. 1(e) is a polarization plate in which retardation film 1 and retardation film 1' are stuck via adhesive agent layer 3 and additionally retardation film 1' and orientation film 2 are stuck via retardation film 3'. The "adhesive agent" refers to an adhesive agent and/or a collective term of an adhesive agent. At least one selected from the group consisting of the above retardation film 1 and retardation film 1' comprises the present optically anisotropic film.

Orientation film 2 should be a film having a polarizing function. Examples of the film include a stretched film which has absorbed a pigment having absorption anisotropy; and a film to which a pigment having absorption anisotropy is applied. Examples of a pigment having absorption anisotropy include a dichroism pigment such as iodine and an azo compound.

Examples of the stretched film which has absorbed a pigment having absorption anisotropy include a film obtained by stretching a polyvinyl alcohol-based film which has absorbed a dichroism pigment; and a film obtained by stretching a polyvinyl alcohol-based film and then absorbing a dichroism pigment.

Examples of the film to which a pigment having absorption anisotropy is applied include a film obtained by applying a composition comprising a dichroism pigment having liquid crystallinity or a composition comprising a dichroism pigment and a polymerizable liquid crystal compound.

The film having a polarizing function preferably has a protective film on one side or both sides. For example, the protective film is identical to the above-mentioned substrate.

Specific examples of the stretched film which has absorbed a pigment having absorption anisotropy include polarization plates described in JP 3708062 B, JP 4432487 B and the like.

Specific examples of the film to which a pigment having absorption anisotropy is applied include orientation films described in JP 2012-33249 A and the like.

The thickness of orientation film 2 is preferably thinner. However, too thin film has a reduced strength and tends to be inferior in workability. The thickness of the orientation film is generally from 0.1 μm to 300 μm, preferably from 1 μm to 200 μm and more preferably from 5 μm to 100 μm.

An adhesive agent to be used in adhesive agent layer 3 and adhesive agent layer 3' is preferably an adhesive agent having high transparency and superior heat resistance. Examples of such an adhesive agent include an acryl-based adhesive agent, an epoxy-based adhesive agent and an urethane-based adhesive agent.

Examples of a display device of the present invention include a liquid crystal display device having a liquid crystal panel in which the present optically anisotropic film is stuck to the liquid crystal panel, and an organic electroluminescence (hereinafter, also referred to as "EL") display device having an organic EL panel obtained by sticking the present optically anisotropic film to a luminescent layer. As to an embodiment of the display device of the present invention, a liquid crystal display device and an organic EL display device will be described.

Figure 2:
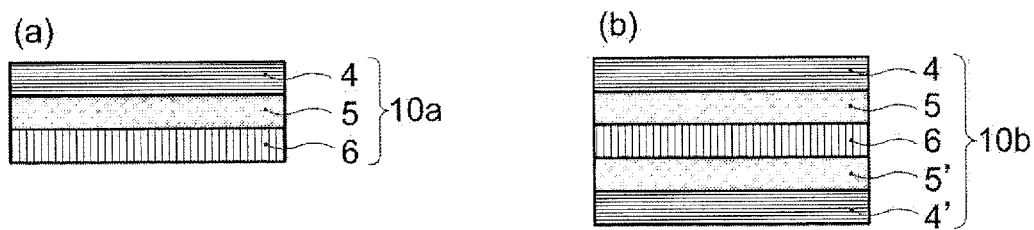
FIG. 2 is a cross-sectional diagram showing an example of a liquid crystal display device according to the present invention.

Examples of the liquid crystal display device include liquid crystal display devices 10a and 10b, which are represented in FIG. 2(a) and FIG. 2(b), respectively. In liquid crystal display device 10a represented in FIG. 2(a), polarization plate 4 of the present invention and liquid crystal panel 6 are stuck via adhesion layer 5. In liquid crystal display device 10b represented in FIG. 2(b), polarization plate 4 of the present invention is stuck to one side of liquid crystal panel 6 via adhesion layer 5, and polarization plate 4' of the present invention is stuck to the other side of liquid crystal panel 6 via adhesion layer 5', respectively. In these liquid crystal display devices, it is possible to change an orientation of a liquid crystal molecule so as to provide monochromatic display by applying voltage to a liquid crystal display with an electrode which is not show in the figures.

Figure 3:
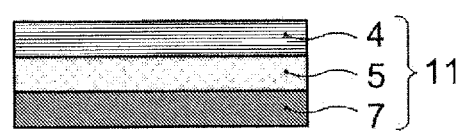
FIG. 3 is a cross-sectional diagram showing an example of an organic EL display device according to the present invention.

Examples of the organic EL display device include an organic EL display device represented in FIG. 3. Examples of the organic EL display device include organic EL display device 11 in which polarization plate 4 of the present invention and organic EL panel 7 are stuck via adhesion layer 5. The above-mentioned organic EL panel 7 is at least one layer comprising an electrically conductive organic compound. According to the above constitution, by applying voltage to an organic EL panel with an electrode which is not show in the figures, it is possible to provide monochromatic display due to emission of a compound contained in an emission layer which the organic EL panel has.

In the above organic EL display device 11, polarization plate 4 preferably acts as a wide band circular polarization plate. When polarization plate 4 acts as a wide band circular polarization plate, it is possible to prevent reflection of an outside light on a surface of organic EL display device 11.

EXAMPLES

Hereinafter, the present invention will be described in more detail by examples. "%" and "part(s)" in the examples refer to % by mass and part(s) by mass, unless otherwise described.

(Preparation of Composition for Forming an Optically Anisotropic Film)

The components in Table 1 were mixed, and the resulting mixture was stirred at 80° C. for 1 hour to obtain a composition for forming an optically anisotropic film.

TABLE 1

|  | Polymerizable liquid crystal compound | Photopolymerization initiator | Leveling agent | Solvent |
|---|---|---|---|---|
| Composition for forming an optically anisotropic film | Compound (A1) (18.9%) | Irg369 (1.1%) | BYK-361N (0.01%) | Cyclopentanone (79.9%) |

The values in Table 1 represent content ratios of each component relative to the total of the prepared composition.

In Table 1, Irg369 represents Irgacure®369 manufactured by BASF Japan, BYK-361N represents a leveling agent manufactured by BYK Japan KK, and compound (A1) represents a liquid crystal compound represented by the following formula.

Compound (A1) was synthesized by the process described in JP 2010-31223 A. Each maximum absorption wavelength of compound (A1) and the photopolymerization initiator is shown in Table 2.

TABLE 2

|  | Maximum absorption wavelength |
|---|---|
| Compound (A1) | 322 nm |
| Irg369 | 320 nm |

In Table 2, the maximum absorption wavelength of compound (A1) exhibits a wavelength range of 250 nm or more, in which the absorbance in a $10^{-4}$ M chloroform solution is 0.01 or higher, and the polymerization initiator exhibits a maximum absorption wavelength.

Example 1

Two weight %-aqueous solution of polyvinyl alcohol (complete saponification type of polyvinyl alcohol, manufactured by Wako Pure Chemical Industries, Ltd.) was applied to a glass substrate, and after heat drying, a film having a thickness of 89 nm was obtained. A rubbing treatment was carried out on a surface of the obtained film, and the composition for forming an optically anisotropic film was applied thereto by spin coating method and dried by heat. Then, a light was applied thereto by means of UNI-CURE (VB-15201BY-A, manufactured by USHIO INC.) in the condition of Example 1 described in Table 3 to obtain an optically anisotropic film. The radiation wavelength and allowable variation range were controlled by means of a bandpass filter (LUX300) manufactured by Asahi Spectra Co., Ltd.

Compound (A1)

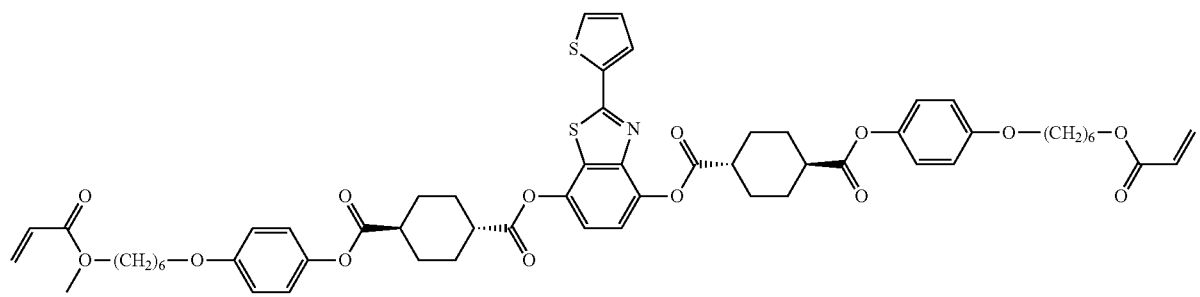

Example 2 and Comparative Example 1

Optically anisotropic films were obtained in the same condition as in Example 1 except in that the light radiation condition was set as described in Example 2 and Comparative example 1 in Table 3.

In Example 2, the radiation wavelength and allowable variation range were controlled by means of a short wavelength cut filter (LX0365) manufactured by Asahi Spectra Co., Ltd. In Comparative example 1, the radiation wavelength and allowable variation range were not controlled, and a light from a light source was directly applied.

TABLE 3

|  | Radiation wavelength | Allowable variation range |
|---|---|---|
| Example 1 | 300-500 nm | 200 nm |
| Example 2 | 365 nm | only bright line |
| Example 3 | 250-500 nm | 250 nm |

Measurement of Optical Performance

The retardation values of the optically anisotropic films obtained in Examples 1 and 2 and Comparative example 1 were measured by means of a measuring apparatus (KOBRA-WR, manufactured by Oji Scientific Instruments). The measurement of the retardation values was carried out using layered product comprising a glass substrate, an orientation film and a film. Since the glass substrate and orientation film do not have birefringence (Re(447)=Re(547)=Re(628)=0), the measured retardation value can be regarded as a retardation value of the optically anisotropic film.

The retardation value Re(λ) was measured at wavelengths (λ) of 451 nm, 549 nm and 628 nm. The film thicknesses of the optically anisotropic film were measured by means of a laser microscope (LEXT, manufactured by Olympus Corporation), and refractive index anisotropy at 549 nm, Δn(549), was calculated. The result is shown in Table 4.

TABLE 4

|  | Re(451) | Re(549) | Re(628) | Re(447)/ Re(547) | Re(628)/ Re(547) | Film thickness (μm) | Δn(549) |
|---|---|---|---|---|---|---|---|
| Example 1 | 130 | 147 | 149 | 0.89 | 1.02 | 2.15 | 0.68 |
| Example 2 | 130 | 146 | 149 | 0.89 | 1.02 | 2.14 | 0.68 |
| Comparative example 3 | 116 | 130 | 133 | 0.89 | 1.02 | 2.13 | 0.61 |

It has been found that the optically anisotropic films in the Examples had a high Δn and high optical performance.

The present invention is useful as a process for producing an optically anisotropic film having a high Δn and superior optical performance.

DESCRIPTION OF SYMBOLS

1, 1': Present retardation film
2: Orientation film
3, 3': Adhesive agent layer
4a, 4b, 4c, 4d, 4e, 4, 4': Polarization plate of present invention
5, 5': Adhesion layer
6: Liquid crystal panel
7: Organic EL panel
10a, 10b: Liquid crystal display device
11: Organic EL panel display device

The invention claimed is:

1. A process for producing an optically anisotropic film, wherein the following steps (A) and (B) are carried out in order:
   (A) a step of applying a composition for forming an optically anisotropic film to a substrate, the composition comprising a photopolymerization initiator, a solvent and a polymerizable liquid crystal compound having a maximum absorption wavelength in a range of 250 nm to 370 nm, and
   (B) a step of applying light with an allowable variation range of less than 250 nm in a wavelength range of 200 nm to 500 nm,
   wherein the film satisfying the following formulae (1) and (2):

$$\Delta n(450)/\Delta n(550) \leq 1.00 \tag{1}$$

$$1.00 \leq \Delta n(650)/\Delta n(550) \tag{2}$$

wherein Δn(450), Δn(550) and Δn(650) represent birefringence indices for lights with wavelengths of 450 nm, 550 nm and 650 nm, respectively.

2. The process for producing an optically anisotropic film according to claim 1, wherein the photopolymerization initiator has a maximum absorption wavelength of 300 nm to 380 nm.

3. The process for producing an optically anisotropic film according to claim 2, wherein the light applied contains light having a wavelength of 365 nm.

4. The process for producing an optically anisotropic film according to claim 1, wherein the light applied contains light having a wavelength of 365 nm.

5. The process for producing an optically anisotropic film according to claim 1, wherein the light applied is a bright line having a wavelength of 365 nm.

6. A optically anisotropic film obtained by the process according to claim 1, wherein the polymerizable liquid crystal compound is a compound represented by formula (A):

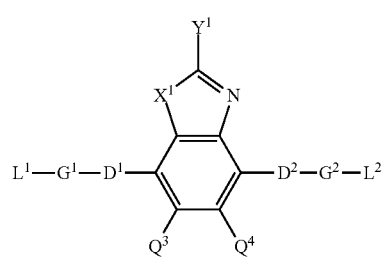

wherein
$X^1$ represents an oxygen atom, a sulfur atom or NR1-, where R1 represents a hydrogen atom or an alkyl group having 1 to 4 carbon atoms, $Y^1$ represents a monovalent aromatic hydrocarbon group having 6 to 12 carbon atoms and optionally having a substituent, or a monovalent aromatic heterocyclic group having 3 to 12 carbon atoms and optionally having a substituent, $Q^3$ and $Q^4$ each independently represent a hydrogen atom, a monovalent aliphatic hydrocarbon group having 1 to 20 carbon atoms and optionally having a substituent, a monovalent alicyclic hydrocarbon group having 3 to 20 carbon atoms, a monovalent aromatic hydrocarbon group having 6 to 20 carbon atoms and optionally having a substituent, a halogen atom, a cyano group, a nitro group, —NR2R3 or —SR2, or $Q^3$ and $Q^4$ are bonded to each other to form an aromatic ring or a heteroaromatic ring with the carbon atoms to which $Q^3$ and $Q^4$ are bonded, wherein R2 and R3 each independently represent a hydrogen atom or an alkyl group having 1 to 6 carbon atoms, $D^1$ and $D^2$ each independently represent a single bond, —C(=O)—O—, —C(=S)—O—, —CR4R5-, —CR4R5—CR6R7-, —O—CR4R5-, —CR4R5—O—CR6R7-, —CO—O—CR4R5-, —O—CO—CR4R5-, —CR4R5—O—CO—CR6R7-, —CR4R5—CO—O—CR6R7-, —NR4—CR5R6- or —CO—NR4-, wherein R4, R5, R6 and R7 each independently represent a hydrogen atom, a fluorine atom or an alkyl group having 1 to 4 carbon atoms, $G^1$ and $G^2$ each independently represent a divalent alicyclic hydrocarbon group having 5 to 8 carbon atoms, wherein any methylene group constituting the alicyclic hydrocarbon group is optionally replaced by an oxygen atom, a sulfur atom or —NH—, and wherein any methine group constituting the alicyclic hydrocarbon group is optionally replaced by a tertiary nitrogen atom, and $L^1$ and $L^2$ each independently represent a monovalent organic group, wherein at least one of $L^1$ and $L^2$ has a polymerizable group.

7. An optically anisotropic film obtained by the process for producing an optically anisotropic film according to claim 1.

8. The optically anisotropic film according to claim 7, the film having retardation performance.

9. A retardation film comprising the optically anisotropic film according to claim 7.

10. A polarization plate comprising the optically anisotropic film according to claim 7.

11. A display device comprising the optically anisotropic film according to claim 7.

* * * * *